United States Patent
Kiyanagi et al.

(10) Patent No.: US 6,185,201 B1
(45) Date of Patent: Feb. 6, 2001

(54) MULTIPLEX RADIO TRANSMITTER AND MULTIPLEX RADIO TRANSMISSION METHOD, MULTIPLEX RADIO RECEIVER AND MULTIPLEX RADIO RECEIVING METHOD, AND MULTIPLEX RADIO TRANSCEIVER AND MULTIPLEX TRANSMISSION/RECEIVING SYSTEM

(75) Inventors: Hiroyuki Kiyanagi, Sendai; Toshiaki Suzuki, Kawasaki; Yasuhiro Shibuya; Hiroshi Suzuki, both of Sendai, all of (JP)

(73) Assignee: Fujitsu Limited, Kawasaki (JP)

( * ) Notice: Under 35 U.S.C. 154(b), the term of this patent shall be extended for 0 days.

(21) Appl. No.: 09/187,386

(22) Filed: Nov. 6, 1998

(30) Foreign Application Priority Data

Mar. 20, 1998 (JP) .................................................. 10-072873

(51) Int. Cl.[7] .................................. H04J 1/00; H04B 1/26
(52) U.S. Cl. ................................................ 370/343; 455/315
(58) Field of Search .................................... 370/319, 344, 370/343, 340; 455/118, 314, 315, 73, 102, 103, 324

(56) References Cited

U.S. PATENT DOCUMENTS

| | | | |
|---|---|---|---|
| 2,233,183 | * 2/1941 | Roder | 370/343 |
| 4,817,167 | * 3/1989 | Gassmann | 455/324 |
| 4,912,773 | * 3/1990 | Schiff | 455/103 |
| 4,965,852 | * 10/1990 | Sasaki | 370/343 |
| 5,077,731 | * 12/1991 | Omiya | 370/343 |
| 5,396,489 | * 3/1995 | Harrison | 370/343 |

* cited by examiner

Primary Examiner—Melvin Marcelo
Assistant Examiner—Phuongchau Ba Nguyen
(74) Attorney, Agent, or Firm—Helfgott & Karas, P.C.

(57) ABSTRACT

The present invention is directed to a multiplex radio transmission/receiving system. The system includes a plurality of transmission sections provided so as to correspond to a plurality of channels, and a plurality of receiving sections provided so as to correspond to the plurality of channels. Each transmission section includes a modulation section, a first frequency conversion section, a first band-pass filter, a second frequency conversion section, and a second band-pass filter. Each receiving section includes a third band-pass filter, a third frequency conversion section, a fourth band-pass filter, a fourth frequency conversion section, and a demodulation section. By selection of an optimum value for a second intermediate frequency of a transmitter and for a third intermediate frequency of a receiver, a group of transmission radio frequencies (RF) signals and a group of local frequency signals are allocated without overlap. As a result, there can be prepared one type of band-pass filter which has broad band-pass characteristics and which is common among the transmission and receiving sections disposed within the multiplex radio transceiver or among repeaters, thus allowing use of common members.

18 Claims, 25 Drawing Sheets

FIG. 10
RELATED ART

4G BAND (IN UNITS OF Hz UNLESS OTHERWISE SPECIFIED)

| B: BANDWIDTH | BW: OCCUPIED BANDWIDTH | X, X': BANDWIDTH GUARD SPACE | Yi, Yc: INTERVALS BETWEEN IDENTICALLY POLARIZED ADJACENT CHANNELS | Z: INTERVALS BETWEEN INNERMOST CHANNELS |
|---|---|---|---|---|
| 600M | 40M | X, X' = 20M | Yi = 80M, Yc = 40M | 80M |

| RF CH No. | Fo: CENTER FREQUENCY (MHz) | RF CH No. | Fo: CENTER FREQUENCY (MHz) |
|---|---|---|---|
| 1 | 3620.0 | 1 | 3940.0 |
| 2 | 3660.0 | 2 | 3980.0 |
| 3 | 3700.0 | 3 | 4020.0 |
| 4 | 3740.0 | 4 | 4060.0 |
| 5 | 3780.0 | 5 | 4100.0 |
| 6 | 3820.0 | 6 | 4140.0 |
| 7 | 3860.0 | 7 | 4180.0 |
| 8 | — | 8 | — |

FIG. 11
RELATED ART

5G BAND (IN UNITS OF Hz UNLESS OTHERWISE SPECIFIED)

| B: BANDWIDTH | BW: OCCUPIED BANDWIDTH | X, X': BANDWIDTH GUARD SPACE | Yi, Yc: INTERVALS BETWEEN IDENTICALLY POLARIZED ADJACENT CHANNELS | Z: INTERVALS BETWEEN INNERMOST CHANNELS |
|---|---|---|---|---|
| 600M | 40M | X, X' = 30M | Yi = 80M, Yc = 40M | 60M |

| RF CH No. | Fo: CENTER FREQUENCY (MHz) | RF CH No. | Fo: CENTER FREQUENCY (MHz) |
|---|---|---|---|
| 1 | 4430.0 | 1 | 4730.0 |
| 2 | 4470.0 | 2 | 4770.0 |
| 3 | 4510.0 | 3 | 4810.0 |
| 4 | 4550.0 | 4 | 4850.0 |
| 5 | 4590.0 | 5 | 4890.0 |
| 6 | 4630.0 | 6 | 4930.0 |
| 7 | 4670.0 | 7 | 4970.0 |
| 8 | — | 8 | — |

FIG. 12
RELATED ART

L6G BAND (IN UNITS OF Hz UNLESS OTHERWISE SPECIFIED)

| B: BANDWIDTH | BW: OCCUPIED BANDWIDTH | X, X': BANDWIDTH GUARD SPACE | Yi, Yc: INTERVALS BETWEEN IDENTICALLY POLARIZED ADJACENT CHANNELS | Z: INTERVALS BETWEEN INNERMOST CHANNELS |
|---|---|---|---|---|
| 500M | 29.65M | X=20.2M, X'=20.21M | Yi=59.3M, Yc=29.65M | 44.49M |

| RF CH No. | Fo: CENTER FREQUENCY (MHz) | RF CH No. | Fo: CENTER FREQUENCY (MHz) |
|---|---|---|---|
| 1 | 5945.20 | 1' | 6197.24 |
| 2 | 5974.85 | 2' | 6226.89 |
| 3 | 6004.50 | 3' | 6256.54 |
| 4 | 6034.15 | 4' | 6286.19 |
| 5 | 6063.80 | 5' | 6315.84 |
| 6 | 6093.45 | 6' | 6345.49 |
| 7 | 6123.10 | 7' | 6375.14 |
| 8 | 6152.75 | 8' | 6404.79 |

FIG. 13
RELATED ART

U6G BAND (IN UNITS OF Hz UNLESS OTHERWISE SPECIFIED)

| B: BANDWIDTH | BW: OCCUPIED BANDWIDTH | X, X': BANDWIDTH GUARD SPACE | Yi, Yc: INTERVALS BETWEEN IDENTICALLY POLARIZED ADJACENT CHANNELS | Z: INTERVALS BETWEEN INNERMOST CHANNELS |
|---|---|---|---|---|
| 680M | 40M | X, X' = 30M | Yi = 80M, Yc = 40M | 60M |

| RF CH No. | Fo: CENTER FREQUENCY (MHz) | RF CH No. | Fo: CENTER FREQUENCY (MHz) |
|---|---|---|---|
| 1 | 6460.0 | 1 | 6800.0 |
| 2 | 6500.0 | 2 | 6840.0 |
| 3 | 6540.0 | 3 | 6880.0 |
| 4 | 6580.0 | 4 | 6920.0 |
| 5 | 6620.0 | 5 | 6960.0 |
| 6 | 6660.0 | 6 | 7000.0 |
| 7 | 6700.0 | 7 | 7040.0 |
| 8 | 6740.0 | 8 | 7080.0 |

FIG. 14
RELATED ART

7G BAND (IN UNITS OF Hz UNLESS OTHERWISE SPECIFIED)

| B: BANDWIDTH | BW: OCCUPIED BANDWIDTH | X, X': BANDWIDTH GUARD SPACE | Yi, Yc: INTERVAL BETWEEN IDENTICALLY POLARIZED ADJACENT CHANNELS | Z: INTERVALS BETWEEN INNERMOST CHANNELS |
|---|---|---|---|---|
| 475M | 28M | X = X' = 17M | Yi = 56M, Yc = 28M | 49 M |

| RF CH No. | Fo: CENTER FREQUENCY (MHz) | RF CH No. | Fo: CENTER FREQUENCY (MHz) |
|---|---|---|---|
| 1 | 7442.0 | 1' | 7687.0 |
| 2 | 7470.0 | 2' | 7715.0 |
| 3 | 7498.0 | 3' | 7743.0 |
| 4 | 7526.0 | 4' | 7771.0 |
| 5 | 7554.0 | 5' | 7799.0 |
| 6 | 7582.0 | 6' | 7827.0 |
| 7 | 7610.0 | 7' | 7855.0 |
| 8 | 7638.0 | 8' | 7883.0 |

FIG. 15
RELATED ART

L8G BAND (IN UNITS OF Hz UNLESS OTHERWISE SPECIFIED)

| B: BANDWIDTH | BW: OCCUPIED BANDWIDTH | X, X': BANDWIDTH GUARD SPACE | Yi, Yc: INTERVALS BETWEEN IDENTICALLY POLARIZED ADJACENT CHANNELS | Z: INTERVALS BETWEEN INNERMOST CHANNELS |
|---|---|---|---|---|
| 550 M | 29.65M | X = 22.7M, X' = 8.43M | Yi = 59.30M, Yc = 29.65M | 103.77M |

| RF CH No. | Fo: CENTER FREQUENCY (MHz) | RF CH No. | Fo: CENTER FREQUENCY (MHz) |
|---|---|---|---|
| 1 | 7747.70 | 1' | 8059.02 |
| 2 | 7777.35 | 2' | 8088.67 |
| 3 | 7807.00 | 3' | 8118.32 |
| 4 | 7836.65 | 4' | 8147.97 |
| 5 | 7866.30 | 5' | 8177.62 |
| 6 | 7895.95 | 6' | 8207.27 |
| 7 | 7925.60 | 7' | 8236.92 |
| 8 | 7955.25 | 8' | 8266.57 |

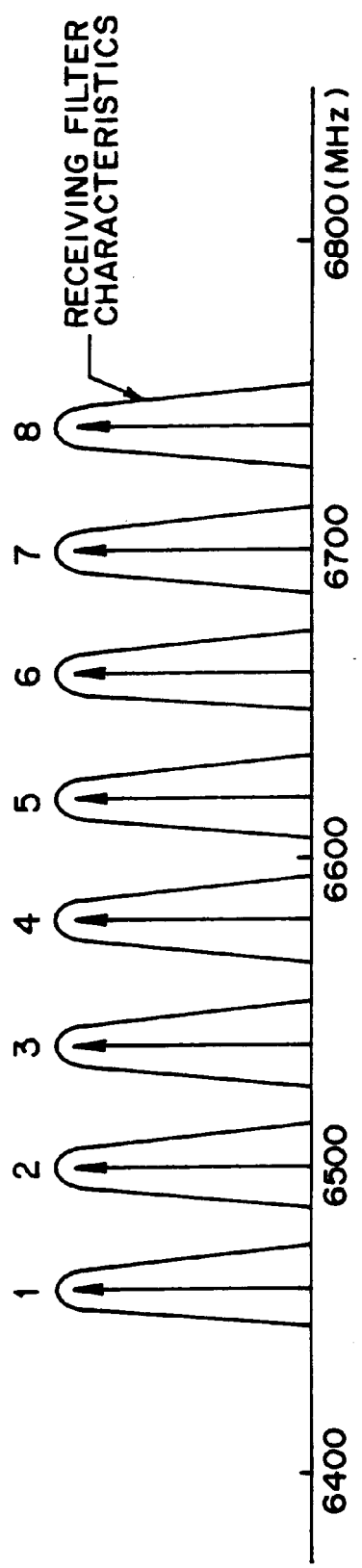

MULTIPLEX RADIO TRANSMITTER AND MULTIPLEX RADIO TRANSMISSION METHOD, MULTIPLEX RADIO RECEIVER AND MULTIPLEX RADIO RECEIVING METHOD, AND MULTIPLEX RADIO TRANSCEIVER AND MULTIPLEX TRANSMISSION/RECEIVING SYSTEM

BACKGROUND OF THE INVENTION

1) Field of the Invention

The present invention relates to a multiplex radio transmitter and multiplex radio transmission method, a multiplex radio receiver and multiplex radio receiving method, and a multiplex radio transceiver and multiplex transmission/ receiving system suitable for use with a trunk multiplex radio communications system.

2) Description of the Related Art

In recent years, when large volumes of information including such as video data are to be transmitted at high speed, a synchronous multiplex transfer mode (Synchronous Transfer Mode) based on a SDH (Synchronous Digital Hierarchy) has been widely used as a method of transmitting information data. Multiplex radio transceivers are usually located on high ground and relay multiplexed trunk signal data at microwave band through use of a synchronous multiplex transfer mode With regard to frequency bands, the allocation of available channels in individual frequency bands is specified in detail in the form of ITU-R (International Telecommunications Union Radio Communications Sector) recommendations.

The trunk multiplex radio communications system occupies a frequency band called C-band (3.4 GHz to 8.5 GHz), and this C-band is further classified into sub-bands: that is, a 4G band, a 5G band, an L6G band, a U6G band, a 7G band, and an L8G band. As shown in FIGS. 10 through 15, the allocation of individual channels within each of the sub-bands is also specified. The 3.5 G band has been specified only in that the ends thereof have been determined as 3.4 GHz and 3.6 GHz, and details of allocation of channels within the frequency band are still under discussion and have not yet been publicly announced.

Although a modulation scheme used for a trunk multiplex radio communications system within a microwave band has not yet been specified by ITU-R recommendations, enterprises adopt a 64 or 128 quadrature amplitude modulation scheme. This is because a large volume of data must be transmitted within the foregoing frequency bands while fulfilling the specifications, such as channel allocations, a per-channel occupied bandwidth, and adjacent channel power, and therefore there is adopted a QAM scheme having a superior frequency efficiency (a transmission rate per 1 Hz).

FIG. 23 shows the principal elements of a transmission section disposed in a transmitter of an existing trunk multiplex radio communications system. A multiplex radio transmitter 38 shown in FIG. 23 transmits a plurality of channel signals having different frequencies while converting them into a multiplexed signal and comprises a plurality of transmission sections 31 corresponding to the individual channels, an antenna 36, and an antenna diplexer 37.

In each transmission section 31, signal data (e.g., STM-1 transmitted over an SDH network) received from a synchronous multiplex repeater or a transmission-end apparatus are subjected to a baseband processing treatment in a baseband processing section (not shown). The thus-processed data are modulated and transmitted to a radio circuit. The transmission section 31 comprises a modulation section 32, a digital-to-analog converter 33, a frequency converter 34, and a band-pass filter 35.

The modulation section 32 modulates multiplexed trunk signal data and comprises a mixer 32a-1, a mixer 32a-2, a 90° phase shifter 32b, a local oscillator 32c, and a hybrid section 32d.

More specifically, I-channel signal data are multiplied by an output signal of 70 MHz outputted from the local oscillator 32c. The mixer 32a-2 multiplies Q-channel signal data by an outputted from the mixer 32a-2 which is produced by phase-shifting the outputted from the local oscillator 32c through 90° by means of the 90° phase shifter 32b. As a result, the signal data items are modulated into a frequency band centered at 70 MHz and are combined into a single waveform by the hybrid section 32d. The value of 70 MHz represents an interval between the local frequency and the radio frequency (RF).

The digital-to-analog converter 33 converts a digital signal outputted from the modulation section 32 into an analog signal.

Further, the frequency converter 34 up-converts the thus-modulated signal having a 70 MHz band into C-band within the microwave band. The mixer 34a multiplies an output from the digital-to-analog converter 33 by a microwave carrier which ranges in frequency from about 3 GHz to 8 GHz and is outputted from the local oscillator 34b.

For each channel, the band-pass filter 35 limits a transmission band of a modulated signal in a microwave band outputted from the frequency converter 34 in such a way as to fulfill specifications defined for an air interface.

The antenna diplexer 37 combines together the band-limited signals outputted from the band-pass filter 35.

The antenna 36 transmits a radio signal outputted from the antenna diplexer 37.

Turning to a method for communications between a pair of multiplex radio repeaters, there has been employed an FDM (Frequency Division Multiplexing) method of enabling simultaneous use of a plurality of channels by a transmit-receive channel of each radio receiver being allocated a different frequency. FIG. 24 shows an example in which each pair of multiplex radio repeaters is allocated a different channel within C-band. The frequency band shown in FIG. 24 corresponds to a U6G band within the C-band and represents a group of radio frequency (RF) channels and a group of local frequencies.

Channels 1 (6,460 MHz) to channel 8 (6,740 MHz) are allocated to a downlink, whereas channel 1' (6,800 MHz) to channel 8' (7,080 MHz) are allocated to a corresponding uplink, thus enabling selection of eight possible channels.

There is overlap between the group of radio frequency (RF) channels and the group of local frequency channels. To prevent spurious radiation, the transmitter must eliminate the local frequency signals so as to prevent these signals from being emitted over the group of radio frequency (RF) channels, through use of a filter having a narrow bandwidth.

In contrast, a receiver has a receiving device having the same frequency as that transmitted from an opposing repeater. As show in FIG. 25, the receiver must separate a channel being used from the eight possible channels through use of the band-pass filter having a narrow bandwidth.

Here, the term "opposing" signifies a repeater with which the current repeater is in communication through use of a downlink channel and an uplink channel corresponding thereto. The term "opposing" will be used herein in the same sense.

To this end, the band-pass filter 35 provided in the transmission section 31 is required to have a narrow band as its band-pass characteristics. Accordingly, to select the channel being used the band-pass filter of the opposing receiver is also required to have a narrow band as its band-pass characteristics.

However, according to the existing technique, a narrow-band filter having its center frequency in a microwave band such as that mentioned previously is very expensive and bulky.

Further, since the individual transmission and receiving sections disposed in the multiplex radio transceiver transmit data through use of a plurality of channels of different frequencies, there is a need for a band-pass filter having band-pass characteristics corresponding to each of the channels, thus impeding realization of a band-pass filter capable of being used in all the channels.

Moreover, data are transmitted between the repeaters through use of a plurality of channels having different frequencies. Even in such a case, there is a need for a band-pass filter having band-pass characteristics corresponding to each of the channels, thus impeding realization of a band-pass filter capable of being used in all the channels.

SUMMARY OF THE INVENTION

The present invention has been conceived in view of the foregoing drawbacks of the related art, and the object of the present invention is to provide a multiplex radio transmitter and a multiplex radio transmission method, a multiplex radio receiver and a multiplex radio receiving method, and a multiplex transceiver and a multiplex transmission/receiving system, wherein a transmitter requires only one type of band-pass filter having broad band-pass characteristics; wherein a receiver requires only one type of band-pass filter which has the same band-pass characteristics as those of the transmitter and which corresponds to frequencies transmitted from the opposing transmitter; and wherein band-pass filters having different band-pass characteristics for respective channels are replaced with identical band-pass filters, thus enabling use of members having common characteristics for the transmission sections and receiving sections disposed within the multiplex radio transceiver or for repeaters, as well as enabling improvement in cost performance.

To this end, according to one aspect of the present invention, there is provided a multiplex radio transmitter which multiplexes a plurality of channel signals having different frequencies into another signal and transmits the multiplexed signal, the transmitter comprising:

a plurality of transmission sections provided so as to correspond to respective channels, wherein
the transmission section comprises
a modulation section which modulates a data signal and outputs the modulated signal as a first intermediate frequency signal;
a first frequency conversion section which converts the frequency of the first intermediate frequency signal outputted from the modulation section, through use of a first local signal to thus output a second intermediate frequency signal which is higher in frequency than the first intermediate frequency signal by only the frequency of the first local signal;
a first filter which eliminates a frequency component of the first local signal from the second intermediate frequency signal outputted from the first frequency conversion section;
a second frequency conversion section which converts the frequency of a signal outputted from the first filter through use of a second local signal to thus output a radio frequency signal which is higher in frequency than the second intermediate frequency signal by only the frequency of the second local signal; and
a second filter which has at least a band-pass corresponding to radio frequency signals of a plurality of channels to be used; which filters out the radio frequency signal outputted from the second frequency conversion section; and which eliminates a frequency component of the second local signal.

In the multiplex radio transmitter according to the present invention, a baseband signal is temporarily converted into a second intermediate frequency, and this second intermediate frequency is selectively set to an optimum value. As a result, a group of transmission radio signals and local frequency signals are allocated at a microwave band without overlap. Consequently, there is required only one type of band-pass filter which is capable of permitting collective passage of a group of radio frequency (RF) signals and which has broad band-pass characteristics. The transmitter is prevented from producing spurious radiation. There is no need to use different channels for respective transmission sections disposed within the multiplex radio transmitter or for respective repeaters, nor is there need to individually prepare band-pass filters having different band-pass characteristics, which would otherwise be required by the existing multiplex radio transmitter. Further, there can be used, for example, a second intermediate frequency which is common to all the sub-bands within C-band (3.4 GHz to 8.5 GHz), thus yielding an advantage of allowing use of common members in the multiplex radio transmitter, as well as allowing inexpensive manufacture of a multiplex radio transmitter.

In a preferred mode, the modulation section can be configured so as to output the first intermediate frequency signal by digitally modulating a digital data signal and converting the digital data signal into an analog data signal.

As a result, there is yielded an advantage of allowing sending of a signal through use of a digital modulation scheme having a superior frequency conversion efficiency.

In a preferred mode, the modulation section can be configured so as to output the first intermediate frequency signal by converting a digital data signal into an analog data signal and modulating the analog data signal in an analog fashion.

As a result, there is yielded an advantage of allowing the first intermediate signal to be freely set.

In a preferred mode, the second intermediate frequency signal can be formed so as to have a frequency whose harmonic component is not superimposed on the radio frequency signal.

As a result, there is yielded an advantage of allowing practical prevention of a harmonic component of the image frequency signal group from colliding with a group of channels lying in sub-bands within C-band, thus enabling an improvement in a signal-to-noise ratio of the receiver in each channel.

In a preferred mode, the second intermediate frequency signal is formed so as to have at least a frequency whose harmonic component of sixth order or lower is not superimposed on the radio frequency signal.

Consequently, of the image frequency signal group, a channel group whose harmonic is of 6$^{th}$ order or lower can be actually prevented from colliding with a channel group lying in sub-bands within, e.g., C-band (3.4 GHz to 8.5 GHz), resulting in an advantage of improving the signal-to-noise ratio of the receiver in each channel.

In one preferred mode, the second frequency conversion section can be configured so as to output the radio frequency signal, by converting the frequency of the signal outputted from the first filter through use of the second local signal having any of a plurality of frequencies corresponding to a plurality of channels.

As a result, three bands, that is, a radio frequency (RF) signal band, a second local signal band, and an image frequency band, can be separated from one another without overlap. There is yielded an advantage of allowing use of only one type of band-pass filter without use of band-pass filters having different band-pass characteristics for transmission sections disposed within the multiplex radio transmitter or for repeaters.

According to another aspect of the present invention, there is provided a multiplex radio transmitter which multiplexes a plurality of channel signals having different frequencies into another signal and transmits the multiplexed signal, the transmitter comprising:

a plurality of transmission sections provided so as to correspond to respective channels, wherein the transmission section comprises a digital modulation section which digitally modulates a digital data signal and converts the digital data signal into an analog data signal, to thus output a first intermediate frequency signal;

a first frequency conversion section which converts the frequency of the first intermediate frequency signal outputted from the digital modulation section, through use of a first local signal, thus outputting a second intermediate frequency signal which is higher in frequency than the first intermediate frequency signal by only the frequency of the first local signal, wherein the second intermediate frequency signal has at least a frequency whose harmonic component of sixth order or lower is not superimposed on a radio frequency signal of at least 4 GHz band or higher to be used as a transmission signal;

a first filter which eliminates a frequency component of the first local signal from the second intermediate frequency signal outputted from the first frequency conversion section;

a second frequency conversion section which converts the frequency of a signal outputted from the first filter, through use of a second local signal having any of a plurality of frequencies corresponding to a plurality of channels, thus outputting the radio frequency signal which is higher in frequency than the second intermediate frequency signal by only the frequency of the second local signal; and a second filter which has at least a band-pass corresponding to radio frequency signals of a plurality of channels to be used; which filters out the radio frequency signal outputted from the second frequency conversion section; and which eliminates a frequency component of the second local signal.

As a result, the multiplex radio transmitter according to the present invention requires only one type of band-pass filter which is capable of permitting collective passage of a group of radio frequency (RF) signals and which has broad band-pass characteristics, thus preventing the transmitter from producing spurious radiation and eliminating a need to use different channels for respective transmission sections disposed within the multiplex radio transmitter or for repeaters or to individually prepare band-pass filters having different band-pass characteristics, which would otherwise be required by the existing multiplex radio transmitter. Consequently, of the image frequency signal group, a channel group whose harmonic is of 6$^{th}$ order or lower can be actually prevented from colliding with a channel group lying in sub-bands within C-band (3.4 GHz to 8.5 GHz), resulting in an advantage of improving the signal-to-noise ratio of the receiver in each channel.

In one preferred mode, the frequency of the second intermediate frequency signal may be set to a required frequency between 842.00 MHz and 845.02 MHz, to a frequency of 844 MHz, or to a frequency of 967.1 MHz.

The frequency can be freely set, and hence there is an advantage of freedom in radio circuit design. Further, the use of the foregoing frequency results in an advantage of preventing collision between image frequency signals of sixth order or lower among the image frequency signal group and channel groups provided in sub-bands within C-band (3.4 GHz to 8.5 GHz). Still further, there is yielded an advantage of improving the signal-to-noise ratio of the receiver in each channel, because in practice the influence of the other image frequency signal group is small.

Still another aspect of the present invention, there is provided a multiplex radio transmission method for use with a multiplex radio transmitter which multiplexes a plurality of channel signals having different frequencies into a signal and transmits the thus multiplexed signal, wherein each of a plurality of transmission sections provided so as to correspond to channels produces a first intermediate frequency signal by modulating a data signal and converts the frequency of the modulated data signal, thereby transmitting a radio frequency signal at a higher frequency, the method being characterized by the feature that when the intermediate frequency signal is converted into the radio frequency signal through frequency conversion, the transmission section converts the intermediate frequency signal into a second intermediate frequency signal having an intermediate frequency between the frequency of the intermediate frequency signal and that of the radio frequency signal and converts the second intermediate frequency signal into the radio frequency signal through frequency conversion.

As a result, the multiplex radio transmission method according to the present invention enables mutual separation of three bands, that is, a radio frequency (RF) signal band, a second local signal band, and an image frequency band without overlap. Consequently, the transmitter requires only one type of band-pass filter which is capable of permitting collective passage of a group of radio frequency (RF) signals and which has broad band-pass characteristics. The transmitter is prevented from producing spurious radiation. There is no need to use different channels for respective transmission sections disposed within the multiplex radio transmitter or for respective repeaters or to individually prepare band-pass filters having different band-pass characteristics, which would otherwise be required by the existing multiplex radio transmitter. Further, there can be used a second intermediate frequency which is common to all the sub-bands within, e.g., C-band (3.4 GHz to 8.5 GHz), thus yielding an advantage of allowing use of common members in the multiplex radio transmitter, as well as enabling inexpensive manufacture of a multiplex radio transmitter.

According to yet another aspect of the present invention, there is provided a multiplex radio receiver including a plurality of receiving sections provided so as to correspond to channels for the purpose of receiving, by way of a radio propagation path, radio frequency signals transmitted from a multiplex radio transmitter disposed so as to oppose the multiplex radio receiver, wherein the multiplex radio transmitter has a plurality of transmission sections which convert a first intermediate frequency signal resulting from modulation of a data signal into a second intermediate frequency signal having an intermediate frequency between the frequency of the first intermediate frequency signal and that of a radio frequency signal; which convert the second intermediate frequency into the radio frequency signal; and which are provided so as to correspond to a plurality of channel signals having different frequencies, the multiplex radio receiver being characterized by the feature that the receiving section comprises a third filter which has at least a band-pass corresponding to radio frequencies of a plurality of channels to be used, which filters out the received radio frequency signal, and which eliminates a frequency component of an image signal of the radio frequency signal;

a third frequency conversion section which converts the frequency of a signal outputted from the third filter through use of a third local signal to thus output a third intermediate frequency signal which is lower in frequency than the radio frequency signal by only the frequency of the third local signal;

a fourth frequency conversion section which converts the frequency of a signal outputted from the third frequency conversion section through use of a fourth local signal to thus output a fourth intermediate frequency signal which is lower in frequency than the third intermediate frequency signal by only the frequency of the fourth local signal; and a demodulation section which demodulates the data signal by demodulation of an outputted from the fourth frequency conversion section.

As a result, the multiplex radio receiver according to the present invention enables mutual separation of three bands, that is, a radio frequency (RF) signal band, a second local signal band, and an image frequency band without overlap. As a result, there is required only one type of band-pass filter for use with a receiving radio frequency (RF) signal band, thus eliminating a need to filter out a signal for each receiving radio frequency (RF) channel. Further, there is no need to prepare band-pass filters having different band-pass characteristics for respective receiving sections disposed within the multiplex radio receiver or for repeaters, thus yielding an advantage of allowing use of members and reducing the cost of the multiplex radio receiver.

In one preferred mode, the transmission section of the multiplex radio transmitter is configured so as to produce the first intermediate frequency signal by digitally modulating a digital data signal and converting the digital data signal into an analog data signal; and the demodulation section of the multiplex radio receiver provided so as to oppose the transmitter is configured so as to demodulate the data signal by converting an outputted from the fourth frequency conversion section through analog-to-digital conversion and demodulating the analog data signal.

As a result, bidirectional communication can be established through use of the multiplex radio transceiver which digitally modulates and demodulates a baseband signal, thereby resulting in an advantage of allowing an increase in a transmission rate.

In one preferred mode, the transmission section of the multiplex radio transmitter may be configured so as to produce the first intermediate frequency signal by converting a digital data signal into an analog data signal and modulating the analog data signal in an analog fashion, and the demodulation section of the multiplex radio receiver disposed so as to oppose the transmitter may be configured so as to obtain the digital data signal by demodulating an analog outputted from the fourth frequency conversion section in an analog fashion and converting the demodulated analog output through analog-to-digital conversion.

Accordingly, with the foregoing configuration, bidirectional communication can be established through use of a multiplex radio transceiver which modulates or demodulates a baseband signal in an analog fashion, thus yielding an advantage of allowing the first intermediate frequency signal (or the fifth intermediate frequency signal) to be freely set.

In one preferred mode, the transmission section of the multiplex radio transmitter may be configured so as to output the radio frequency signal, by converting the frequency of the signal outputted from the first filter through use of the second local signal having any of a plurality of frequencies corresponding to a plurality of channels, and the third frequency conversion section of the multiplex radio receiver disposed so as to oppose the transmitter may be configured so as to output the third intermediate frequency signal, by converting the frequency of the signal outputted from the third filter through use of the third local signal having any of a plurality of frequencies corresponding to a plurality of channels.

With such a configuration, the band-pass characteristics of the transmission band-pass filter of the transmitter can be made equal to those of the receiving band-pass filter. There can be prepared identical band-pass filters for the transmission sections of the multiplex radio transmitter, for the receiving sections of the multiplex radio receiver, or for repeaters, thus yielding an advantage of the ability to use common members and to promote cost cutting.

According to a further aspect of the present invention, there is provided a multiplex radio receiving method of receiving radio frequency signals transmitted over a radio propagation path from a multiplex radio transmitter disposed so as to oppose a multiplex radio receiver, by means of a plurality of receiving sections provided so as to correspond to the respective channels, wherein the multiplex radio transmitter has a plurality of transmission sections which convert a first intermediate frequency signal resulting from modulation of a data signal into a second intermediate frequency signal having an intermediate frequency between the frequency of the first intermediate frequency signal and that of a radio frequency signal, which convert the second intermediate frequency into the radio frequency signal, and which are provided so as to correspond to a plurality of channel signals having different frequencies, the multiplex radio receiving method being characterized by the feature that the receiving section converts the radio frequency signal to a third intermediate frequency signal, which is lower in frequency than the radio frequency signal, through frequency conversion;

converts the third intermediate frequency signal to a fourth intermediate frequency signal, which is lower in frequency than the third intermediate frequency signal, through frequency conversion; and demodulates the data signal by demodulation of the fourth intermediate frequency signal.

The multiplex radio receiving method according to the present invention enables separation of three bands, that is, a receiving radio frequency (RF) signal band, a third local signal band, and an image frequency band, from one another without overlap. As a result, there is required only one type of band-pass filter for use with a receiving radio frequency (RF) signal band, thus eliminating a need to filter out a signal for each receiving radio frequency (RF) channel. Further, there can be used the third intermediate frequency which is common to all the sub-bands within, for example, C-band (3.4 GHz to 8.5 GHz), thus yielding an advantage of enabling use of common members in the receiving sections disposed within the multiplex radio receiver or in repeaters, as well as allowing inexpensive manufacture of a multiplex radio receiver.

According to a still further aspect of the present invention, there is provided a multiplex radio transceiver comprising:

a multiplex radio transmitter which includes a plurality of transmission sections provided so as to correspond to respective channels for the purpose of multiplexing a plurality of channel signals having different frequencies into another signal and for the purpose of transmitting the multiplexed signal, wherein the transmission section comprises a modulation section which modulates a data signal and outputs the modulated data signal as a first intermediate frequency signal;

a first frequency conversion section which converts the frequency of a signal outputted from the modulation section through use of a first local signal, thus outputting a second intermediate frequency signal which is higher in frequency than the first intermediate frequency signal by only the frequency of the first local signal;

a first filter which eliminates a frequency component of the first local signal from the second intermediate frequency signal outputted from the first frequency conversion section;

a second frequency conversion section which converts the frequency of a signal outputted from the first filter through use of a second local signal, thus outputting a radio frequency signal which is higher in frequency than the second intermediate frequency signal by only the frequency of the second local signal; and a second filter which has at least a band-pass corresponding to radio frequency signals of a plurality of channels to be used, which filters out the radio frequency signal outputted from the second frequency conversion section, and which eliminates a frequency component of the second local signal; and a multiplex radio receiver which includes a plurality of receiving sections provided so as to correspond to the channels to be used by the multiplex radio transmitter for the purpose of receiving, by way of a radio propagation path, radio frequency signals transmitted from the multiplex radio transmitter disposed so as to oppose the multiplex radio receiver, wherein the multiplex radio transmitter has the plurality of transmission sections which convert a first intermediate frequency signal resulting from modulation of a data signal into a second intermediate frequency signal having an intermediate frequency between the frequency of the first intermediate frequency signal and that of the radio frequency signal transmitted from the multiplex radio transmitter, and which convert the second intermediate frequency into the radio frequency signal, the multiplex radio receiver being characterized by the feature that the receiving section comprises a fourth filter which has at least a band-pass corresponding to radio frequencies of a plurality of channels to be used, which filters out the received radio frequency signal, and which eliminates a frequency component of an image signal of the radio frequency signal;

a fifth frequency conversion section which converts the frequency of a signal outputted from the fourth filter through use of a fifth local signal to thus output a fifth intermediate frequency signal which is lower in frequency than the radio frequency signal by only the frequency of the fifth local signal;

a sixth frequency conversion section which converts the frequency of a signal outputted from the fifth frequency conversion section through use of a sixth local signal to thus output a sixth intermediate frequency signal which is lower in frequency than the fifth intermediate frequency signal by only the frequency of the sixth local signal; and a demodulation section which demodulates the data signal by demodulation of an outputted from the sixth frequency conversion section.

The multiplex radio transceiver according to the present invention enables simultaneous and bidirectional transmission and reception of signals. The transmitter requires only one type of transmission band-pass filter without use of a transmission band-pass filter for each radio frequency (RF) channel. Similarly, the receiver requires only a receiving band-pass filter having the same band-pass characteristics as those of the transmission band-pass filter of the transmitter without use of a receiving band-pass filter for each radio frequency (RF) channel. Accordingly, there is yielded an advantage of allowing use of common members in the transmission sections and receiving sections disposed within the multiplex radio transceiver or in repeaters, as well as enabling inexpensive manufacture of a multiplex radio transceiver.

According to a further aspect of the present invention, there is provided a multiplex radio transceiver comprising:

a multiplex radio transmitter which includes a plurality of transmission sections provided so as to correspond to respective channels for the purpose of multiplexing a plurality of channel signals having different frequencies into another signal and for the purpose of transmitting the multiplexed signal, wherein the transmission section comprises a modulation section which modulates a data signal and outputs the modulated data signal as a first intermediate frequency signal;

a first frequency conversion section which converts the frequency of a signal outputted from the modulation section through use of a first local signal, thus outputting a second intermediate frequency signal which is higher in frequency than the first intermediate frequency signal by only the frequency of the first local signal;

a first filter which eliminates a frequency component of the first local signal from the second intermediate frequency signal outputted from the first frequency conversion section;

a second frequency conversion section which converts the frequency of a signal outputted from the first filter through use of a second local signal, thus outputting a radio frequency signal which is higher in frequency than the second intermediate frequency signal by only the frequency of the second local signal; and a second filter which has at least a band-pass corresponding to radio frequency signals of a plurality of channels to be used, which filters out the radio frequency signal outputted from the second frequency conversion section, and which eliminates a frequency component of the second local signal; and a multiplex radio receiver which includes a plurality of receiving sections provided so as to correspond to the respective channels for the purpose of receiving, by way of a radio propagation path, radio frequency signals transmitted from the plurality of transmission sections of the multiplex radio transmitter, the multiplex radio receiver being characterized by the feature that the receiving section comprises a third filter which has at least a band-pass corresponding to radio frequencies of a plurality of channels to be used, which filters out the received radio frequency signal, and which eliminates a frequency component of an image signal of the radio frequency signal;

a third frequency conversion section which converts the frequency of a signal outputted from the third filter through use of a third local signal to thus output a third intermediate frequency signal which is lower in frequency than the radio frequency signal by only the frequency of the third local signal;

a fourth frequency conversion section which converts the frequency of a signal outputted from the third frequency conversion section through use of a fourth local signal to thus output a fourth intermediate frequency signal which is lower in frequency than the third intermediate frequency signal by only the frequency of the fourth local signal; and a demodulation section which demodulates the data signal by demodulation of an outputted from the fourth frequency conversion section.

The multiplex radio transmission/receiving system according to the present invention enables simultaneous and bidirectional transmission and reception of signals. The transmitter requires only one type of transmission band-pass filter without use of a transmission band-pass filter for each radio frequency (RF) channel. Similarly, the receiver requires only a receiving band-pass filter having the same band-pass characteristics as those of the transmission band-pass filter of the transmitter without use of a receiving band-pass filter for each radio frequency (RF) channel. Accordingly, there is yielded an advantage of enabling common use of the members in the transmission sections and receiving sections disposed within the multiplex radio transceiver or in repeaters, as well as enabling inexpensive manufacture of a multiplex radio transceiver and promoting cost cutting. Further, the harmonic of the second intermediate frequency does not collide with signals at sub-bands within, for example, C-band, and there is yielded an advantage of improving a signal-to-noise ratio of the receiver, as well as preventing superimposition of resultant spurious radiation of an image signal on a main signal.

BRIEF DESCRIPTION OF THE DRAWINGS

FIG. 10 shows a table showing numbers of (uplink/downlink) channels within 4G band, correspondence between frequencies, and other specifications according to general ITU-R recommendations;

FIG. 11 shows a table showing numbers of (uplink/downlink) channels within 5G band, correspondence between frequencies, and other specifications according to general ITU-R recommendations;

FIG. 12 shows a table showing numbers of (uplink/downlink) channels within L6G band, correspondence between frequencies, and other specifications according to general ITU-R recommendations;

FIG. 13 shows a table showing numbers of (uplink/downlink) channels within U6G band, correspondence between frequencies, and other specifications according to general ITU-R recommendations;

FIG. 14 shows a table showing numbers of (uplink/downlink) channels within 7G band, correspondence between frequencies, and other specifications according to general ITU-R recommendations;

FIG. 15 shows a table showing numbers of (uplink/downlink) channels within L8G band, correspondence between frequencies, and other specifications according to general ITU-R recommendations;

FIG. 25 shows a group of radio frequency (RF) channels of a multiplex radio transmitter and a band-pass filter provided for each channel or a group of radio frequency (RF) channels of a multiplex receiver and a band-pass filter disposed for each channel.

DESCRIPTION OF THE PREFERRED EMBODIMENTS (A) Description of a First Embodiment Preferred embodiments of the present invention will now be described hereinbelow by reference to the accompanying drawings.

Figure 1:
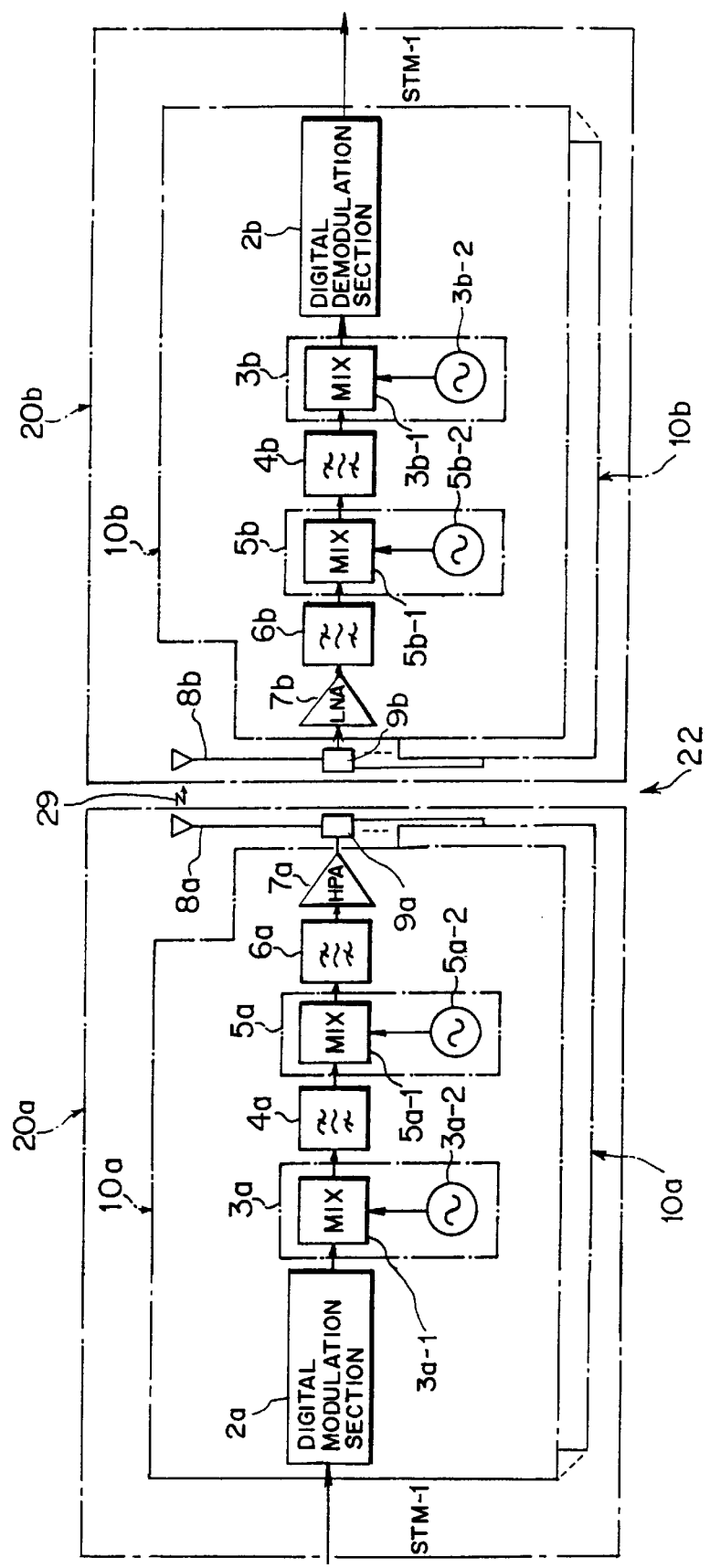
FIG. 1 is a schematic diagram showing the configuration of a trunk multiplex radio transmission/receiving system using a digital modulation scheme according to a first embodiment of the present invention.

FIG. 1 is a circuit diagram showing the configuration of a trunk multiplex radio transmission/receiving system using a digital modulation scheme according to a first embodiment of the present invention. A trunk multiplex radio transmission/receiving system 22 using a digital modulation scheme and shown in FIG. 1 relays multiplexed trunk signal data (STM-1) between synchronous multiplex repeaters or between a synchronous multiplex repeater and a transmission-end apparatus. The trunk multiplex radio transmission/receiving system 22 comprises a multiplex radio transmitter (hereinafter often referred to simply as a "transmitter") 20a which transmits a plurality of channel signals having different frequencies while converting them into a multiplexed signal; a multiplex radio receiver (hereinafter often referred to simply as a "receiver") 20b which receives a plurality of multiplexed channel signals having different frequencies; and a radio propagation path 29.

Here, the transmitter 20a digitally modulates multiplexed trunk signal data (STM-1) received from a synchronous multiplex repeater or a transmission-end apparatus and transmits the thus-modulated data to the radio propagation path 29. The transmitter 20a comprises a plurality of radio transmission sections 10a provided so as to correspond to respective channels; an antenna 8a; and an antenna diplexer 9a.

A frame format of the trunk multiplex signal data (STM-1) comprises an SOH (Section Over Head) which will serve as a header and multiplexed data.

The SOH consists of additional bits for establishing a layer 2 link between synchronous multiplex repeaters or between a synchronous multiplex repeater and a transmission-end apparatus, thus embodying features such as an error correction capability, a client service information capability, a resending control capability, or the like.

A transmission rate of STM-1 is 155.52 Mbps and corresponds to 2,016 channels of a telephone line, provided that the transmission rate per channel is 64kbps. A modulation rate corresponds to a value resulting from dividing a transmission rate of 155.52 Mbps by loge (a multivalued modulation number). More specifically, in a case where a 64 QAM scheme is used, there is obtained a modulation rate of 155.52 (Mbps)/6(bits)=about 26 Mbps. In a case where a 128 QAM scheme is used, there is obtained a modulation rate of 155.52 (Mbps)/7(bits)=about 22 Mbps.

As set forth, the modulation rate is univocally determined by means of a STM-1 transmission frame format and by a multivalued digital modulation number.

Each radio transmission section 10a subjects the multiplexed trunk STM-1 data to a required baseband processing treatment in a baseband processing section and digitally modulates the thus-processed data. The transmission section 10a comprises a digital modulation section 2a, a first frequency converter 3a, a first band-pass filter 4a, a second frequency converter 5a, a second band-pass filter 6a, and a high power amplifier 7a.

Figure 2:
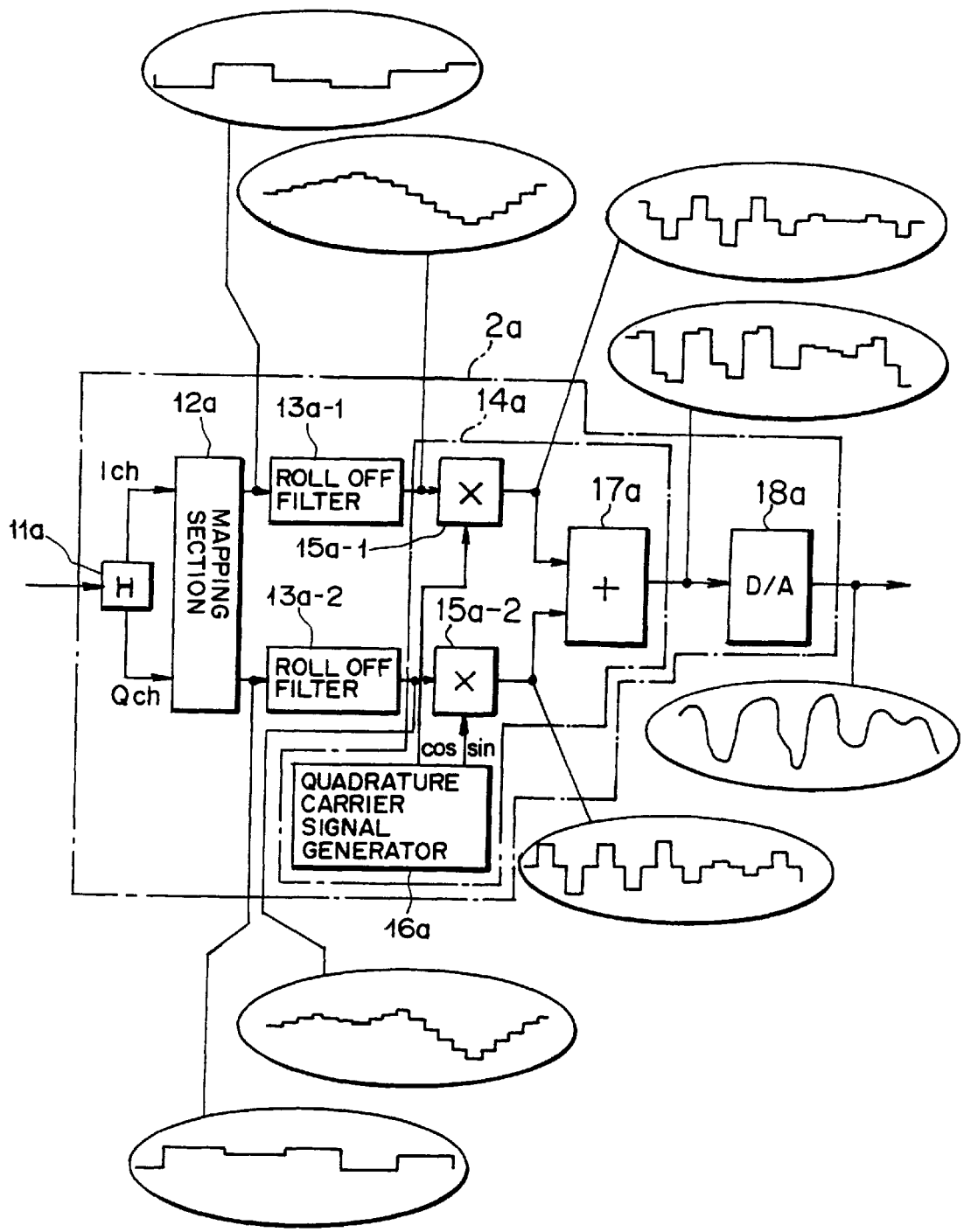
FIG. 2 is a block diagram showing a digital modulation section according to the first embodiment of the present invention.

The digital modulation section 2a digitally modulates the STM-1 data processed by the baseband processing section. As shown in FIG. 2, the digital modulation section 2a comprises a hybrid section 11a, a mapping section 12a, a roll-off filter 13a-1, a roll-off filter 13a-2, a quadrature modulation section 14a, and a digital-to-analog converter 18a.

The hybrid section 11a converts the STM-1 data into parallel data through serial-to-parallel conversion.

The mapping section 12a maps data bits of the I- and Q-channels into a constellation (or an arrangement of signal points) in groups data bits—which are equal in number to a multivalued modulation number—and encodes the amplitude and phase of the transmitted signal.

The roll-off filter 13a-1 processes the I-channel signal through waveform shaping at a rate which is four times the modulation rate, in order to prevent intersymbol interference at the receiving end. Similarly, the roll-off filter 13a-2 processes the Q-channel signal at a rate which is four times the modulation speed.

The quadrature modulation section 14a performs a baseband modulation operation by multiplying the oversampled I-channel signal—which is an outputted from the roll-off filter 13a-1—and the oversampled Q-channel signal-which is an outputted from the roll-off filter 13a-2—by a clock signal which is four times as fast as the modulation rate. The quadrature modulation section 14a comprises a mixer 15a-1, a mixer 15a-2, a quadrature carrier signal generator 16a, and an adder 17a.

The mixer 15a-1 multiplies the I-channel signal—which is oversampled at a rate four times the modulation rate and is outputted from the roll-off filter 13a-1—by a quadrature carrier signal which is as fast as the I-channel signal.

More specifically, as is obvious from boxes provided in FIG. 2, the I-channel data signal—whose amplitude is sampled at a rate four times the modulation rate $f_Q$—is multiplied by $\cos[2\cdot\pi\cdot(4\cdot f_Q)\cdot t]$ which is produced by the quadrature carrier signal generator 16a and assumes three values 1,0,−1,0,1 . . . , whereby the data are converted into a data string of I,0,−I,0,I,0,−I,0,I,0,−I, . . . .

Similarly, the Q-channel data signal—whose amplitude is sampled at a rate four times the modulation rate $f_Q$—is multiplied by $\sin[2\cdot\pi\cdot(4\cdot f_Q)\cdot t]$ which is produced by the quadrature carrier signal generator 16a and assumes three values 0,1,0,−1,0 . . . , whereby the data are converted into a data string of 0,Q,0,−Q,0,Q,0, −Q,0,Q,0, . . . .

The adder 17a adds the I-channel data outputted from the mixer 15a-1 to the Q-channel data outputted from the mixer 15a-2, thus outputting a data string of I,Q,−I,−Q,I,Q,−I,−Q, I,Q,−I, . . . because of only a phase difference of $(\pi/2)$ between cos and sin.

In short, in view of an output of the modulation section, the I-channel data and the Q-channel data appear to be selectively output.

More specifically, the quadrature carrier signal generator 16a is a counter provided within an LSI (Large Scale Integration) circuit and produces the carrier signal by dividing the fastest clock signal. Accordingly, an arbitrary frequency cannot be selected.

Figure 3A:
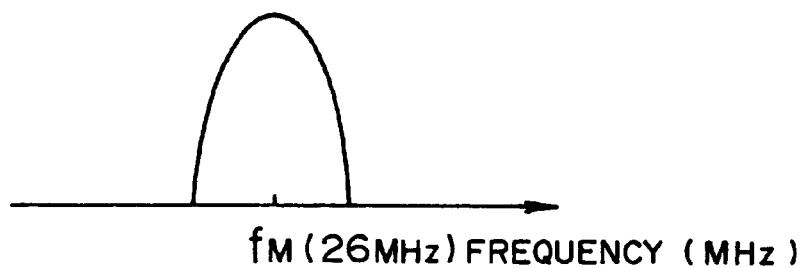
FIG. 3(a) shows a spectrum of an outputted from a digital modulation section provided at the transmission end according to the first embodiment.

The digital-to-analog converter 18a converts digital data outputted from the quadrature modulation section 14a into analog data and produces an output spectrum such as that shown in FIG. 3 (a). The spectrum comes about while being centered on the modulation rate $f_M$.

The first frequency converter 3a converts a first IF signal (a first intermediate frequency signal) outputted from the digital modulation section 2a into a second IF signal (a second intermediate frequency signal) which is higher in frequency than the first IF signal by only the frequency of a first local signal of the first frequency converter. In the first frequency converter 3a, a mixer 3a-1 mixes a signal outputted from a first local signal oscillator 3a-2 into the first IF signal outputted from the digital modulation section 2a.

The way the frequency value of the second IF signal is determined will be described later.

Figure 3B:
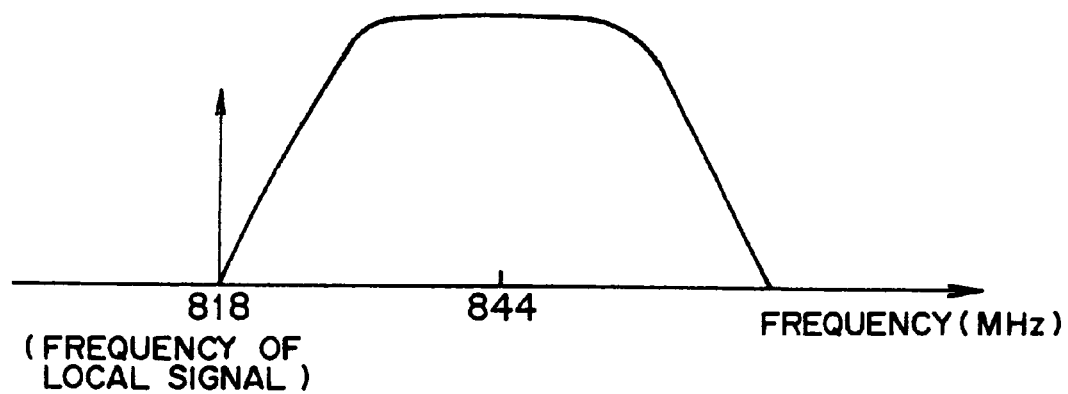
FIG. 3(b) shows the band-pass characteristics of a first band-pass filter provided at the transmission end or those of a fourth band-pass filter provided at the receiving end according to the first embodiment.

The first band-pass filter 4a eliminates a frequency component of the first local signal outputted from the first frequency converter 3a, thus permitting passage of only the second IF signal. FIG. 3(b) shows the band-pass characteristics of the first band-pass filter 4a. As shown in this drawing, the first band-pass filter 4a permits passage of only the frequency of 844 MHz, which is the frequency of the second IF signal (the way the frequency of the second IF signal is determined will be described later) but prevents the passage of the first local signal whose frequency (818 MHz) is lower than that of the second IF signal by about 26 MHz.

The second frequency converter 5a outputs a radio frequency (RF) signal by up-converting an outputted from the first band-pass filter 4a through use of a second local signal capable of oscillating eight kinds of frequencies. A mixer 5a-1 mixes a second local signal outputted from a second local signal oscillator 5a-2 with the second IF signal outputted from the first band-pass filter 4a.

Figure 4:
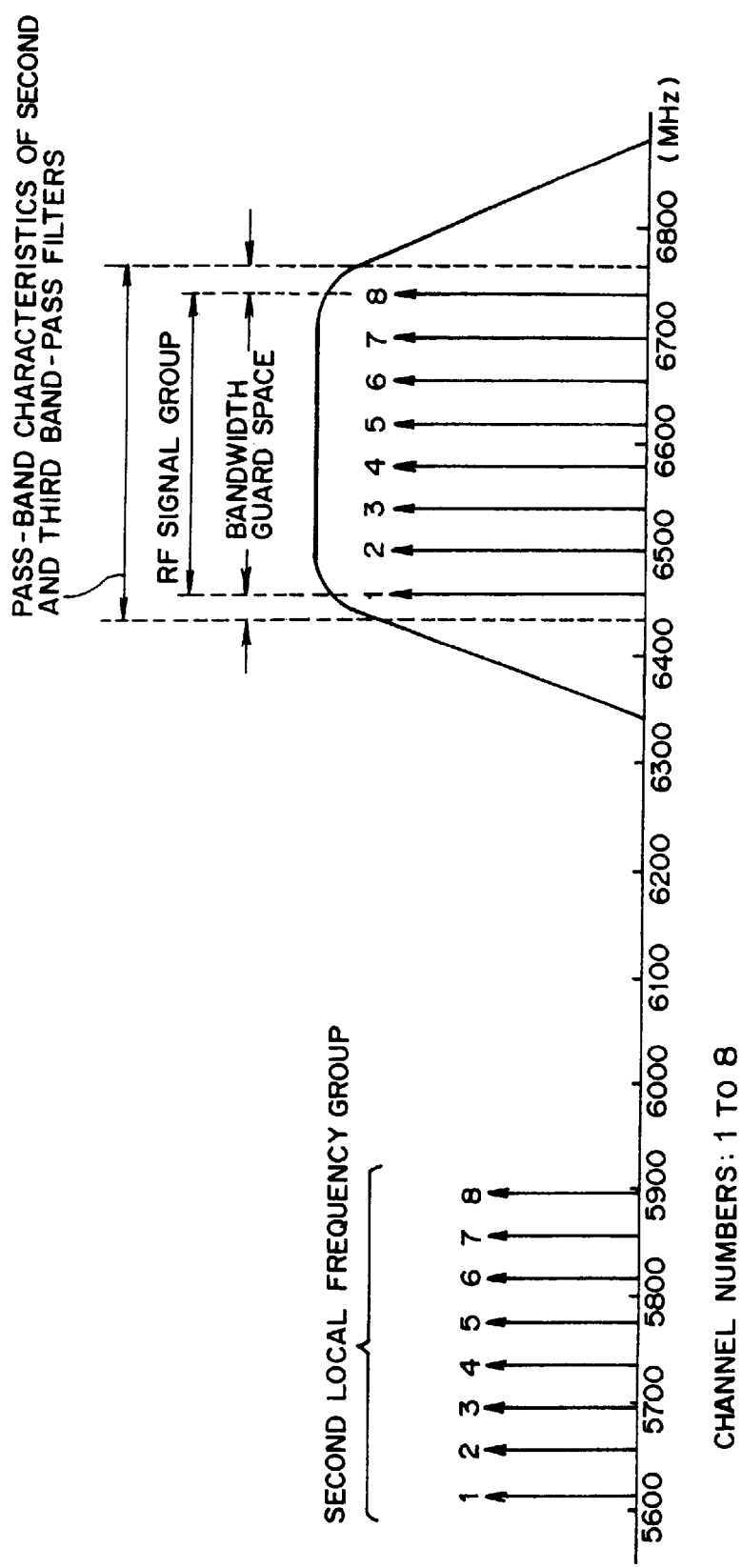
FIG. 4 shows frequency allocation of a radio frequency (RF) signal group and a local signal group and the band-pass characteristics of a second band-pass filter disposed at the transmission end or those of a third band-pass filter disposed at the receiving end according to the first embodiment.

For example, FIG. 4 shows allocation of a group of frequencies of the second local signal and radio frequencies (RF), through use of the U6G band as a sub-band. As shown in the drawing, the group of frequencies of the second local signal and the group of radio frequency (RF) signals do not overlap one another and are separated in frequency from one another.

Further, the second band-pass filter 6a has at least a band-pass width corresponding to radio frequency signals of a plurality of channels to be used and filters the radio frequency (RF) signal outputted from the second frequency converter 5a, thus eliminating a frequency component of the second local signal.

The band-pass characteristics of the second band-pass filter 6a shown in FIG. 4 are such that the center frequency lies in the microwave band, and the second band-pass filter has a band-pass width of 340 MHz. Specifically, the pass-band width corresponds to the sum of the radio frequency (RF) group of 280 MHz and the bandwidth guard space of 30 MHz provided on either side thereof. As a result, individual channels of the group of radio frequency (RF) signals can be collectively passed through use of only one type of second band-pass filter having broad band-pass characteristics, without need for a second band-pass filter having narrow band-pass characteristics for each radio frequency (RF) signal channel.

A signal-to-noise ratio of the receiver can be improved, so long as the value of the second IF frequency is selected in such a way as to prevent collision between the image frequency obtained by multiplication of the second IF frequency by the local signal and a signal in another sub-band within C-band.

The high power amplifier 7a amplifies a radio frequency (RF) signal outputted from the second band-pass filter 6a with high efficiency and low distortion.

The antenna 8a is connected to each of the radio transmission sections 10a via the antenna diplexer 9a and transfers to the radio propagation path 29 the digitally-modulated radio frequency (RF) signals outputted from the individual radio transmission sections 10a. Specifically, the antenna 8a is configured as an antenna to be shared among the radio transmission sections 10a.

The antenna diplexer 9a connects the radio frequency (RF) signals outputted from the individual radio transmission sections 10a to the shared antenna 8a.

In contrast, the receiver 20b digitally demodulates the radio frequency (RF) signal, which has passed through the radio propagation path 29, and sends the STM-1 signal to another synchronous multiplex repeater or another transmission-end apparatus. To this end, the receiver 20b shown in FIG. 1 comprises an antenna 8b, an antenna diplexer 9b, a plurality of radio receiving sections 10b provided so as to correspond to the individual channels, and a baseband processing section (not shown).

The antenna 8b is connected to each of the radio receiving sections 10b via the antenna diplexer 9b and receives a radio frequency (RF) signal. More specifically, the antenna 8b is constituted as an antenna to be shared among the radio receiving sections 10b.

Each radio receiving section 10b digitally demodulates the radio frequency (RF) signal received by the antenna 8b and outputs the STM-1 signal after having subjected the RF signal to a baseband processing treatment. The radio receiving section 10b comprises a low-noise amplifier 7b, a third band-pass filter 6b, a third frequency converter 5b, a fourth band-pass filter 4b, a fourth frequency converter 3b, and a digital demodulator 2b.

The low-noise amplifier 7b amplifies the radio frequency (RF) signal received by the antenna 8b with little noise.

The third band-pass filter 6b has at least a band-pass width corresponding to radio frequency signals of a plurality of channels to be used. The third band-pass filter 6b eliminates a frequency component of the image signal from the radio frequency (RF) signal outputted from the low-noise amplifier 7b, thus selecting a desired signal. As a result, individual channels of radio frequency (RF) signals can be collectively passed through use of only one type of band-pass filter without need for a band-pass filter for each radio frequency (RF) signal channel. The third band-pass filter 6b has band-pass characteristics such as those shown in FIG. 4. The third IF signal used in the receiver has a frequency of 844 MHz; the reason for this will be described later.

The third frequency converter 5b converts the frequency of the radio frequency (RF) signal outputted from the third band-pass filter 6b, through use of a third local signal, thereby outputting a third IF signal whose frequency is lower than that of the radio frequency (RF) signal by the frequency of the third local signal. A mixer 5b-1 mixes a third local signal outputted from a third local signal oscillator 5b-2 with the radio frequency (RF) signal outputted from the third band-pass filter 6b.

The fourth band-pass filter 4b eliminates an image signal from the outputted from the third frequency converter 5b, thus permitting passage of only the third IF signal.

As shown in FIG. 3(b), the band-pass characteristics of the fourth band-pass filter 4b permit passage of only a frequency of 844 MHz, which corresponds to the third IF signal, but prevent passage of the first local signal (818 MHz) whose frequency is lower than that of the third IF signal by about 26 MHz. The way a value of the second IF signal is determined will be described later.

The fourth frequency converter 3b down-converts the third IF signal outputted from the fourth band-pass filter 4b into a fourth IF signal whose frequency is lower than that of the third IF signal. A mixer 3b-1 mixes a fourth local signal outputted from a fourth local signal oscillator 3b-2 with the radio frequency (RF) signal outputted from the fourth filter 4b.

Figure 5:
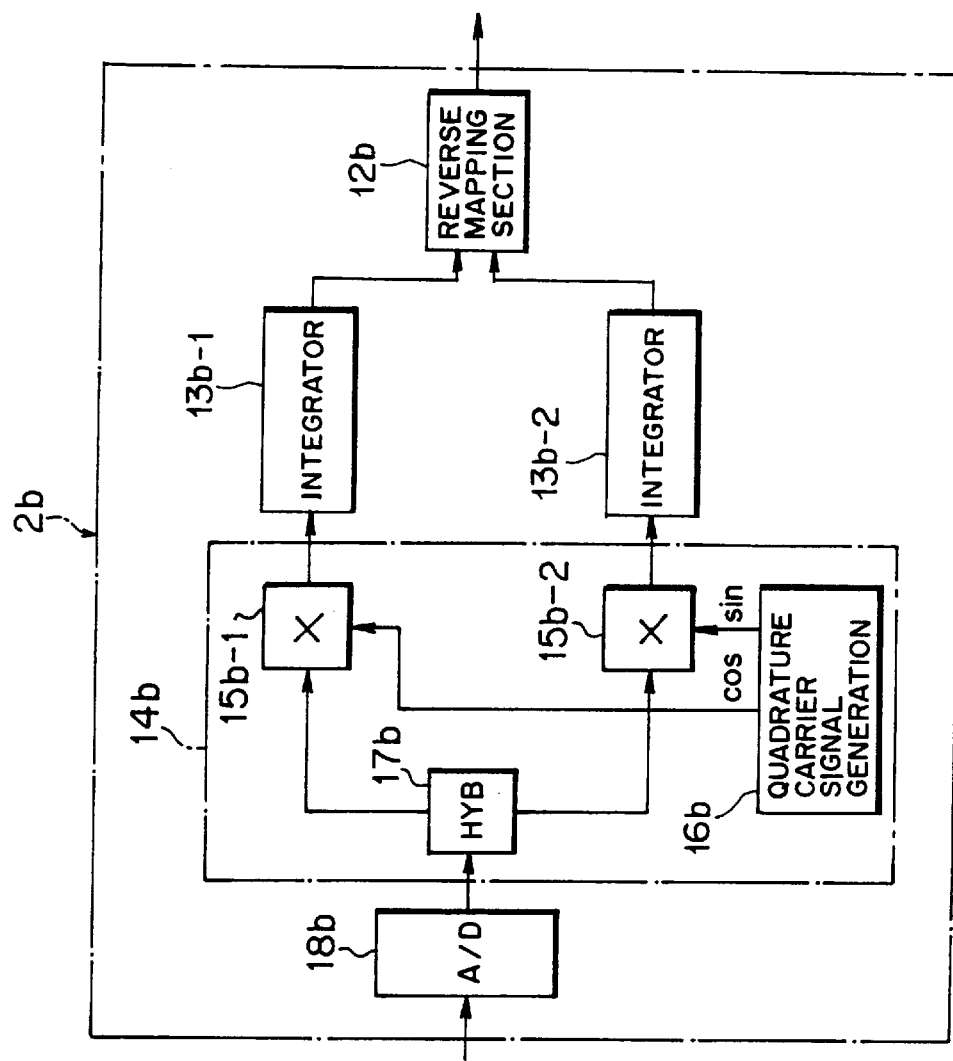
FIG. 5 is a block diagram showing a digital demodulation section according to the first embodiment.

The digital demodulation section 2b digitally demodulates the outputted from the fourth frequency converter 3b and as shown in FIG. 5 comprises an analog-to-digital converter 18b, a quadrature detection section 14b, an integrator 13b-1, an integrator 13b-2, and a reverse mapping section 12b.

The analog-to-digital converter 18b converts the fourth IF signal received from the fourth frequency converter 3b through analog-to-digital conversion.

The quadrature detection section 14b demodulates a digital signal outputted from the analog-to-digital converter 18b and comprises a hybrid section 17b which converts an outputted from the analog-to-digital converter 18b through serial-to-analog conversion; a quadrature carrier signal generator 16b which produces quadrature carrier signals $\cos[2 \cdot \pi \cdot (4 \cdot v) \cdot t]$ and $\sin[2 \cdot \pi \cdot (4 \cdot v) \cdot t]$ (v: modulation rate); a mixer 15b-1 which reproduces a bit string having amplitude values by multiplication of I-channel data by the quadrature carrier signal; and a mixer 15b-2 which reproduces a bit string having amplitude values by multiplication of Q-channel data by the quadrature carrier signal.

The integrator 13b-1 extracts the bit position of demodulated data regarding the modulation rate "v" from an I-channel bit string which is outputted from the quadrature detection section 14b and is sampled at high speed. Similarly, the integrator 13b-2 extracts the bit position of demodulated data regarding the modulation rate "v" from a Q-channel bit string which is outputted from the quadrature detection section 14b and is sampled at high speed.

The reverse mapping section 12b decodes the amplitude and phase of the transmitted signal from the demodulated data bits regarding the modulation speed outputted from the integrators 13b-1 and 13b-2, thereby extracting demodulated data in an actual signal space in groups of data bits which are equal in number to the multivalued modulation number.

The demodulated data are subjected to a required baseband processing treatment in the baseband processing section and are sent as STM-1 data to another synchronous multiplex repeater or a transmission-end apparatus.

Full duplex communication is established between the two opposing repeaters over the radio propagation path 29 through use of required channels. Of these channels, one type of channel is used for a backup purpose. A master repeater transmits a radio signal at, e.g., a downlink transmission frequency X which is one of seven types of channels. A slave repeater which opposes the master repeater receives the thus-transmitted signal having the transmission frequency X. Simultaneously, the slave repeater transmits a signal at an uplink transmission frequency X', and the master repeater which opposes the slave repeater receives the signal having the transmission frequency X'.

For example, frequencies in a U6G band within C-band are allocated in a manner such as that shown in FIG. 13; namely, the uplink channel is allocated channel 1' (a frequency of 6800.0 MHz) to channel 8' (a frequency of 7080.0 MHz); and the downlink channel is allocated channel 1 (a frequency of 6460.0 MHz) to channel 8 (a frequency of 6740.0 MHz).

Since the transmitter and the receiver each select one channel from the eight types of channels, they become symmetrical to each other in terms of band-pass characteristics.

For example, in a case where a frequency of 844 MHz is selected as the second and third IF frequencies, three bands, i.e., the radio frequency (RF) signal, band the local signal band, and the image frequency band, can be allocated as shown in FIG. 4 in such a way as not to overlap one another. As a result, the local signal band is separated from the group of radio frequency (RF) signals, and the transmitter requires only one type of band-pass filter capable of permitting collective passage of the plurality of radio frequency (RF) signals. Members having common specifications can be used for the individual radio transmission sections disposed within the multiplex radio transmitter or for repeaters. Therefore, there is no need for individual band-pass filters having different band-pass characteristics, which would otherwise be provided for individual radio transmission sections or repeaters.

So long as the second IF signal is selected so as to prevent collision between the image frequency obtained by multiplication of the second IF frequency by the local signal and a signal in another sub-band within C-band, the transmitter will be prevented from producing spurious radiation, and the signal-to-noise ratio of the receiver can be improved.

Similarly, the receiver does not require in its front-end stage filters having band-pass characteristics corresponding to the channels used for individual radio receiving sections or repeaters. The receiver requires only one type of band-pass filter, thus enabling use of members having common specifications for the individual radio receiving sections provided within the multiplex radio receiver or for repeaters.

The intermediate frequency determined in consideration of such a special value will be referred to as an "optimum second IF" at the sending end and as an "optimum third IF" at the receiving end.

A method of selecting the optimum second and third IF frequencies will now be described in detail.

The optimum second IF signal F1 (or the optimum third IF signal) is determined in consideration of the following:

(1) The radio frequency (RF) signal band and the local signal band must be sufficiently separated from each other in order to prevent overlap among the radio frequency (RF) signal band, the local signal band, and the image frequency band and to separate them from one another. This is because small difference between the bands may cause the local signal band to mixedly exist within the radio frequency (RF) signal band.

(2) The lower limit of the optimum second or third IF frequency is taken into consideration.

(3) The image frequency [a theoretically infinite number of frequency groups produced from a harmonic of the local signal and a harmonic of the radio frequency (RF) signal] must be prevented from falling within the radio frequency (RF) signal band. In short, the radio frequency (RF) signal is protected from the influence of the image frequency.

(4) The second IF frequency is selected not only so as to become effective within one transmit/receive sub-band within C-band (ranging in frequency from 3.4 GHz to 3.5 GHz) but also so as to become useful as a shared second IF among all the other sub-bands.

The foregoing items (1) through (4) will now be examined.

With regard to item (1), a frequency difference on the order of several tens of mega-hertz is evidently insufficient, and hence the frequency difference is set to about several hundreds of mega-hertz.

Next, item (2) is examined. Since the second IF frequency at the sending end and the third IF frequency at the receiving end are equal to each other, attention is focused on only the second IF frequency at the sending end.

The lower limit of the optimum second IF frequency described in item (2) is determined by the bandwidth of the sub-band. As shown in FIG. 4, when the transmission radio frequency (RF) signal is extracted for each band through use of the common band-pass filter, in each frequency band the band-pass of the filter must be wider than the sum of the bandwidth of channels 1 through 8 and a band-width guard space widths provided at each end of the band, in order to prevent the upper limit of the local signal band from overlapping with the lower end of the radio frequency (RF) signal band. Of the individual sub-bands, the sub-band having the widest bandwidth is U6G band (680 MHz). Assuming that the optimum second IF frequency is F1, we have $$F1 > 680 \tag{1}$$

Item (3) will now be described by reference to FIGS. 6 and 7.

Figure 6:
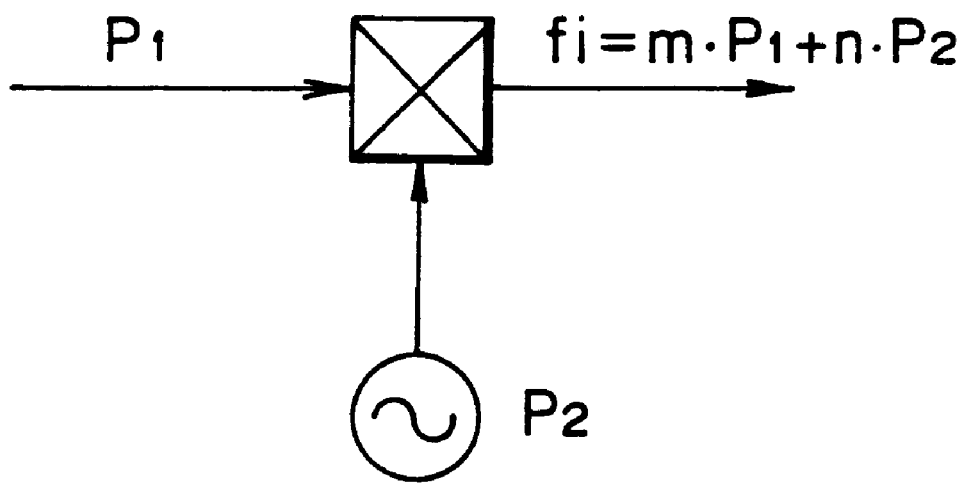
FIG. 6 is a diagrammatic representation showing a frequency conversion section which produces an image frequency according to the first embodiment.
Figure 7:
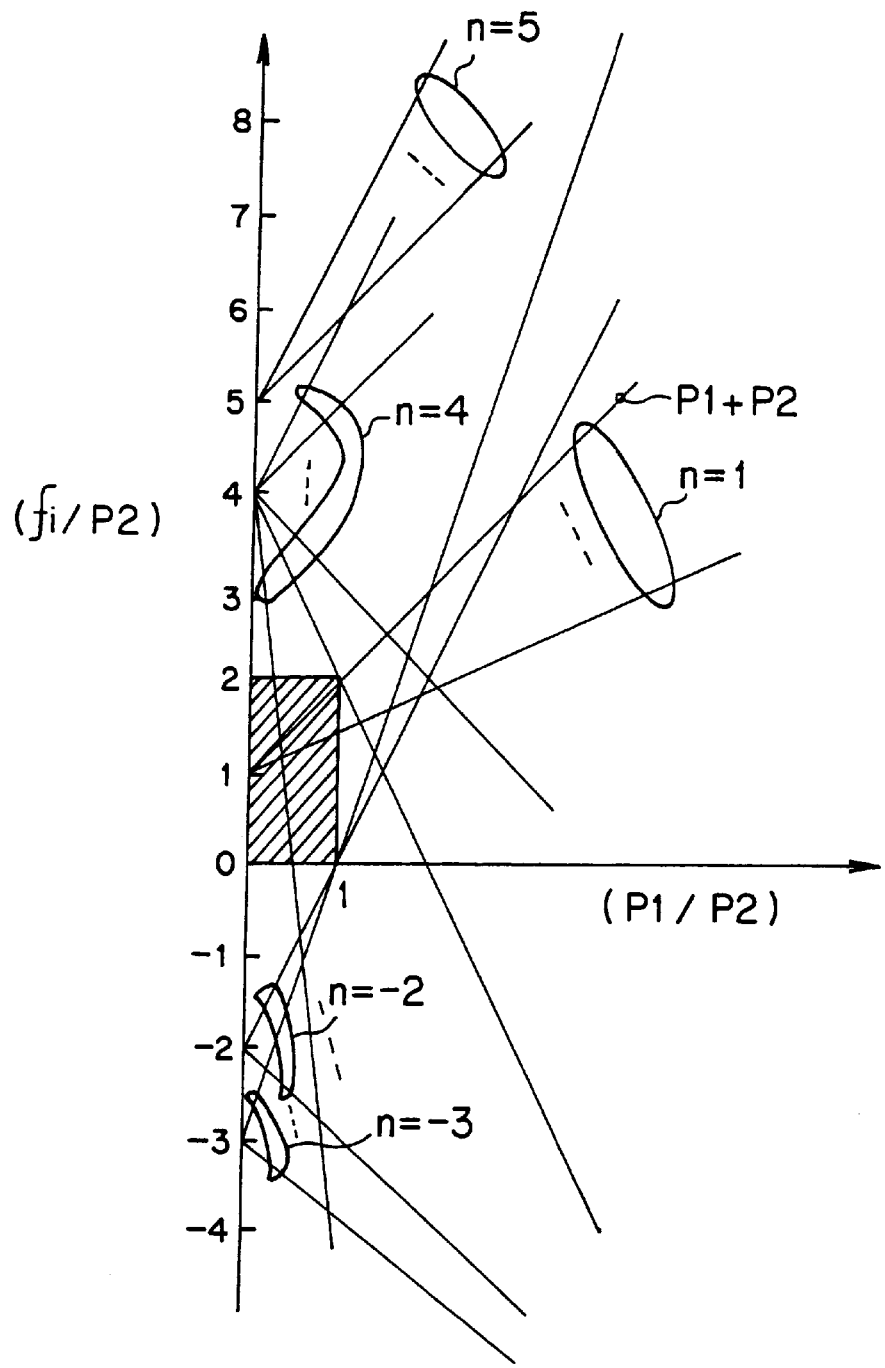
FIG. 7 is a plot visually showing image frequencies according to the first embodiment by mapping a straight line $(f/F2)=m\cdot(F1/F2)+n$.

FIG. 6 schematically shows a frequency converter which produces an image frequency. The frequency converter shown in FIG. 6 multiplies the fundamental harmonic P1 of the second intermediate frequency by the fundamental harmonic P2 of the carrier frequency. Here, the harmonics of P1 and P2 are also multiplied together, thereby resulting in unwanted image frequency components. An image frequency $f_i$ is expressed by the sum of an integral multiple of P1 and an integral multiple of P2.

$$f_i = m \cdot P1 + n \cdot P2 \tag{2}$$

where "m" and "n" represent integers. For example, $f_i=P1+P2$ represents a signal obtained when m=1 and n=1. This signal is at the upper side of the carrier and is not eliminated by the band-pass filter: namely, the signal corresponds to the transmission radio frequency (RF) signal. In contrast, $f_i=-P1+P2$ represents a signal obtained when m=−1 and n=1. This signal is at the lower side of the carrier and is eliminated by the band-pass filter.

Equation (2) is changed into $$f_i/P2 = m \cdot (P1/P2) + n \tag{3}$$

When equation (3) is plotted while taking (P1/P2) as the horizontal axis and ($f_i$/P2) as the vertical axis, there are obtained a group of straight lines having slopes "m" and intercepts "n" on the vertical axis. FIG. 7 shows segments of exemplary straight lines having intercepts n=1, n=−2, n=−3, n=4, and n=5.

A group of straight lines having n=1 are defined by $f_i=P1+P2$ (m=k, n=1: k is an integer) which represents a group of straight lines having an intercept of one and slopes ranging from +∞ to −∞.

Groups of straight lines having intercepts n=−2, n=−3, n=4, and n=5 are represented respectively by $f_i=P1+P2$ (m=k, n=−2: k is an integer),
$f_i=P1+P2$ (m=k, n=−3: k is an integer),
$f_i=P1+P2$ (m=k, n=4: k is an integer), and
$f_i=P1+P2$ (m=k, n=5: k is an integer).

These expressions represent groups of straight lines having changed intercepts and slopes ranging from +∞ to −∞.

Figure 8:
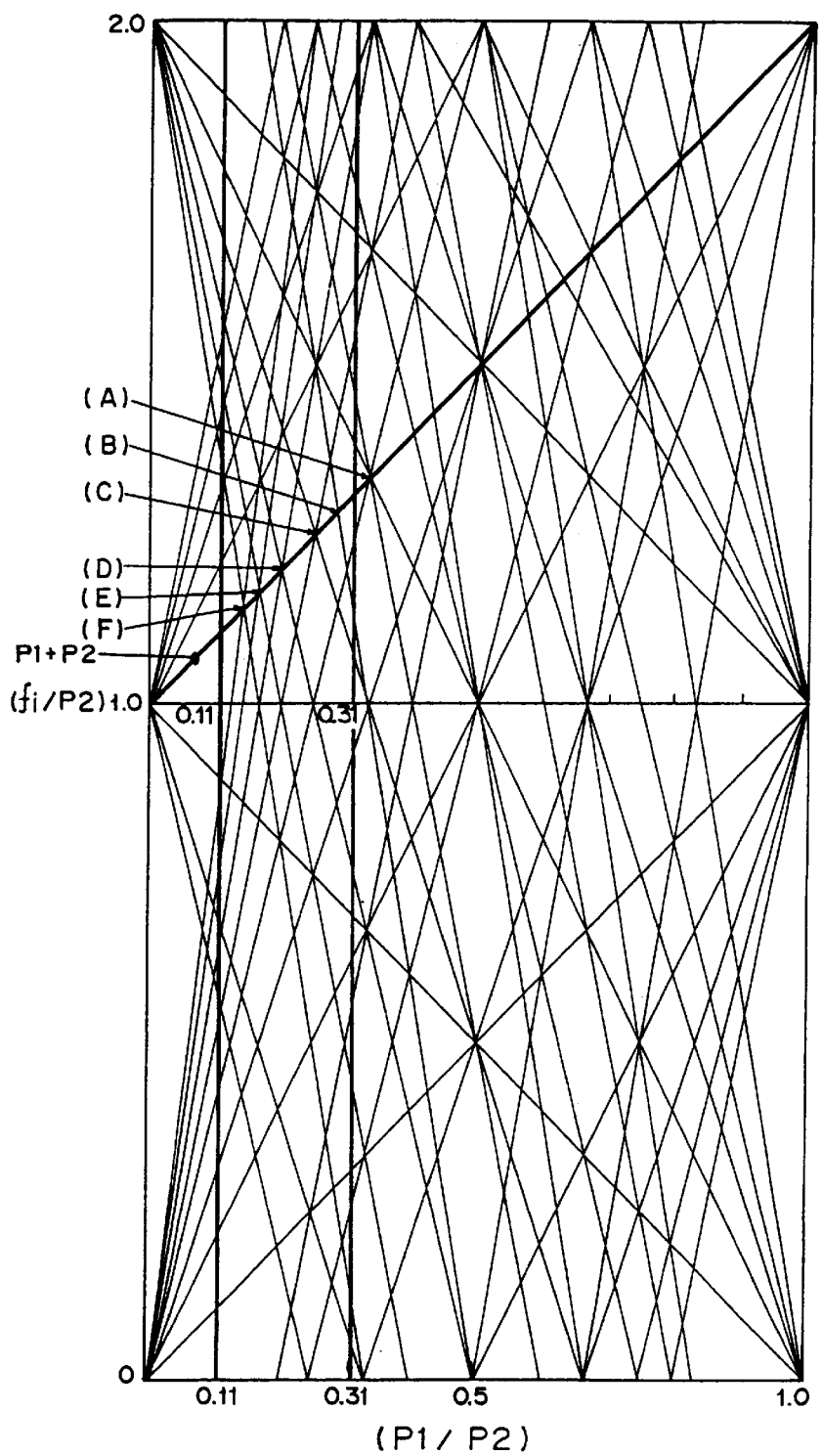
FIG. 8 is an enlarged view showing the principal element shown in FIG. 7 according to the first embodiment and showing collision between transmission radio frequency (RF) signals and image frequencies.

Here (P1/P2) represents a ratio of P2 to P1 and assumes a value between 0 and 1. The ratio physically represents the upper limit of P1. More specifically, carrier P2 assumes a large value ranging in frequency from 3.4 GHz to 8.3 GHz, and carrier P1 representing a signal frequency assumes a value which does not exceed the value of P2. Only a hatched region provided in FIG. 7; namely, the extent to which (P1/P2) assumes 0 through 1, requires attention. FIG. 8 is an enlarged view of the hatched region.

The vertical axis ($f_i$/P2) represents the magnitude of the image frequency fi normalized with respect to P2, i.e., a value which expresses extension or contraction of the scale of the vertical axis.

In FIG. 8, the straight line designated by P1+P2 corresponds to the transmission radio frequency (RF) signal, and hence the conditions provided in item (3) must be taken into consideration. Specifically, the radio frequency (RF) signal is protected from the influence of the image frequency.

The thick line (P1+P2) shown in FIG. 8 represents a radio frequency (RF) sent to a radio channel. Two straight lines crossing each other on the line (P1+P2) are merely image frequencies which come into collision with the line (P1+P2) at that frequency.

The range of the horizontal axis (P1/P2) must be limited to a range which can be of practical use. This is because as mentioned above (P1/P2) represents a ratio of P2 to P1 and cannot assume a value close to 1.

The optimum second intermediate frequency F1 is determined, and a possible range of the carrier frequency F2 is examined, whereby a range of (F1/F2) is plotted on the coordinate system comprising the (P1/P2) axis and the ($f_i$/P2) axis.

First, in view of the foregoing items (1) and (2), the optimum second intermediate frequency F1 must be lower than 3.4 GHz and greater than at least 680 MHz which is the maximum value of the radio frequency (RF) signal bandwidth.

Further, in view of item (4), the optimum second intermediate frequency F1 must be considerably low so that it can be shared among sub-bands within C-band. For example, in a case where the transmission radio frequency (RF) signal band is the 4G band and where the second optimum intermediate frequency F1 is set to a large value such as 3 GHz, the carrier F2 is allocated to a low value such as 620 MHz to 860 MHz.

Further, in consideration of the fact that many existing band-pass filters have their center frequencies around 800 MHz, the optimum second intermediate frequency F1 is set to 800 MHz.

The optimum second intermediate frequency F1 is not limited to 800 MHz but can be set to an arbitrary value within the foregoing range. Hence, (F1/F2) also assumes a range which is substantially the same as that of the second intermediate frequency.

At this time, the third intermediate frequency F2 assumes a value within a range in the vicinity of C-band [e.g., a range (2.6 GHz to 7.5 GHz) lower than C-band by 800 MHz], and hence (F1/F2) assumes a value within a range from 800/7500 to 800/2600 (=0.11 to 0.31).

In consideration of item (3), attention is paid to the order of the harmonic within a range of m=−6−+6 and n=−6 to +6.

In this way, the range of the horizontal axis (P1/P2) falls within a range from 0.11 to 0.31, and therefore the types of image frequencies falling into the range are limited to the following six points A, B, C, D, E, and F: namely, (A) 2F2−2F1      (5)

=3F2−5F1      (6)

=4F1      (7)

(B) 3F2−6F1      (8)

(C) 2F2−3F1      (9)

=5F1      (10)

(D) 2F2−4F1      (11)

=6F1      (12)

(E) 2F2−5F1      (13)

=7F1      (14)

(F) 2F2−6F1      (15)

=8F1      (16)

where the symbol "=" represents an identical point. Of these frequencies (A), (B), (C), (D), (E), and (F), there are selected frequencies wherein at least one equation is represented by a term of $5_{th}$ order or lower: namely, (A), (C), (D), and (E). Since frequencies including a harmonic term of 6 order or higher, such as (B) and (F), cause great attenuation, they are omitted. Point (D) receives very small influence from 6F1 but chiefly receives influence from 2F2 to 4F1. The same applies to frequency (E). More specifically, it is essential only that frequencies 4F1, 5F1, 6F1, and 7F1, which greatly affect F1+F2, be omitted from existing sub-bands within C-band.

As can be seen from item (4), it is essential only that the optimum second intermediate frequency F1 is determined so as to prevent the harmonic of the optimum second intermediate frequency F1, i.e. m·F1, from coming into collision with existing sub-bands within C-band.

Figure 9:
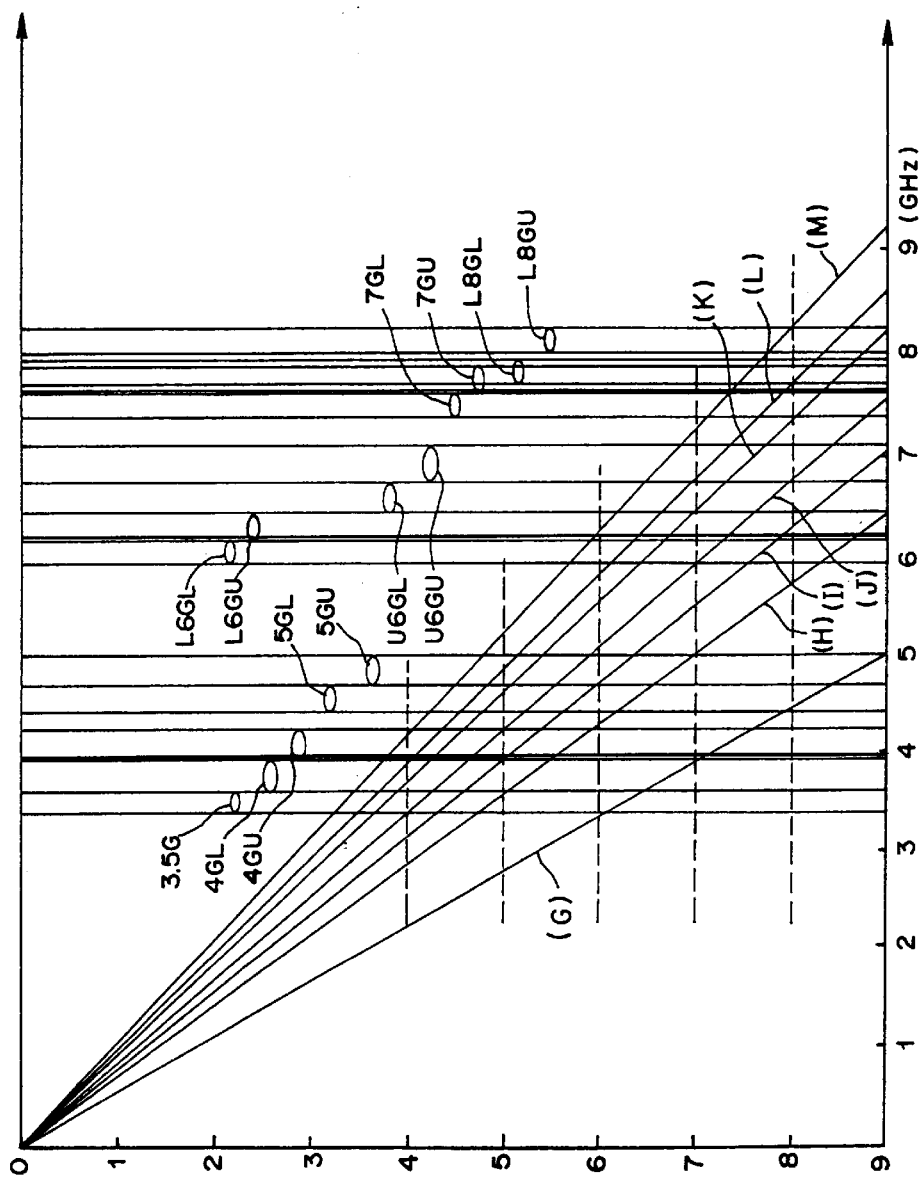
FIG. 9 is a plot showing straight lines so as to prevent collision between harmonics of P1 and sub-bands within C-band according to the first embodiment.

FIG. 9 shows overlaps between the harmonic f=m·F1 of the second intermediate frequency F1 and the individual sub-bands within C-band. The horizontal axis represents frequency, and the vertical axis represents orders of harmonic components of the second IF. FIG. 9 shows seven types of sub-bands within C-band: namely, 3.5G band (3.5 G), 4 G band (4GL, 4GU), 5 G band (5GL, 5GU), L6G band (L6GL, L6GU), U6G band (U6GL, U6GU), 7 G band (7GL, 7GU), and L8G band (L8GL, L8GU). Six straight lines (G), (H), (I), (J), (K), (L), and (M) are plotted on the coordinate system. From the drawing, it is understood which one of the sub-bands overlaps with the m-order harmonic of the optimum second IF F1.

For example, a straight line (H) shown in the drawing is drawn freehand so as to satisfy the following conditions.

A harmonic of fourth order does not come into contact with the lower end of 3.5 G band (ranging in frequency from 3400 MHz to 3600 MHz).

A harmonic of fifth order passes through a range from channel 7 to channel 1' in 4 G band (i.e., 3860 MHz to 3940 MHz) where no channels are allocated.

A harmonic of sixth order passes through a range from channel 7 to channel 1' in 5 G band (i.e., 4670 MHz to 4730 MHz) where no channels are allocated.

A harmonic of seventh order does not come into contact with the lower end of L6G band (channel 1=5945.20 MHz).

There will be described in detail conditions under which the six straight lines (G) to (M) do not come into contact with the individual sub-bands. FIGS. 10 through 15 show the allocation of channels within the individual sub-bands 4 G band, 5 G band, L6G band, U6G band, 7 G band, and L8G band defined by ITU-R recommendations. These channel allocations will be referred to one by one. The band-width guard space provided on each end of the frequency allocation has a medium or small capacity of ±10M×2=±20 MHz or a large capacity of ±15M×2=±30 MHz.

Straight line (G) is determined in such a way that a harmonic of 5·F1 passes through a gap between the upper end of 3.5 G band and the lower end of 4 G band.

3600+20<5·F1<3620−30

∴ No solution

Straight line (H) is determined in such a way that a harmonic of 4·F1 does not come into contact with the lower end of 3.5 G band; such that a harmonic of 5·F1 passes through a gap in 4 G band; and such that a harmonic of 6·F1 passes through a gap in 5 G band.

4·F1<3400−20

∴ F1<845

3860+30<5·F1<3940−30

∴ 778<F1<782

4670+30<6·F1<4730−30

∴ 783<F1<783

∴ No solution under these three conditions

Straight line (I) is determined in such away that a harmonic of 4·F1 does not come into contact with the lower end of 3.5 G band; such that a harmonic of 5·F1 does not come into contact with the upper end of 4 G band; such that a harmonic of 6·F1 does not come into contact with the upper end of 5 G band; and such that a harmonic of 7·F1 does not come into contact with the lower end of L6G band.

4·F1<3400−20

∴ F1<845

4180+30<5·F1

∴ F1>842.00

4970+30<6·F1

∴ F1>833.33

7·F1<5945.20−30

∴ F1<845.02

842.00<F1<845.02      (17)

Straight line (J) is determined in such a way that a harmonic of 4·F1 does not come into contact with the upper end of 3.5 G band; such that a harmonic of 7·F1 does not come into contact with the upper end of L6G; and such that a harmonic of 7·F1 does not come into contact with the lower end of U6G band.

3600+20<4·F1

∴ F1>905

6404.79+30 <7·F1<6460.0−30

∴ 919.3<F1<918.6

∴No solution under these two conditions

Straight line (K) is determined in such a way that a harmonic of 7·F1 passes through a gap in U6G band; and such that a harmonic of 8·F1 does not come into contact with the lower end of L8G band.

6740+30 <7·F1<6800−30

∴967.14<F1<967.14

8·F1<7747.70−30

∴F1<964.7

∴No solution under these two conditions.

However, F1=967.14 MHz can be used for approximation up to the harmonic of seventh order (18).

Straight line (L) is determined in such a way that a harmonic of 8·F1 does not come into contact with the upper end of L8G band.

8266.57+30<8·F1

∴F1>1037

∴Provided that F1 corresponds to the minimum frequency of 3400 MHz within C-band, (F1/F2) is determined as 1038/(3400−1038)=0.44 which is out of the defined rage of 0.11 to 0.31 shown in FIG. 6, and therefore F1>1037 is omitted.

Straight line (M) is determined in such a way that a harmonic of 6·F1 does not come into contact with the lower end of 3.5 G band.

6·F1<3400

∴F1<566 (19)

As a result, the frequencies defined in (17), (18), and (19) can be adopted as an intermediate frequency.

From Equation 1 resulting from (1), the optimum second IF is adopted in consideration of (17) and (18). Specifically, 842.00<F1<845.02 (20)

F1=967.1 MHz (possible for a harmonic of up to seventh order) (21).

Similarly, the optimum third IF used at the receiving end also adopts the frequencies defined in (20) and (21).

As mentioned above, according to the first embodiment, a transmission signal is subjected to the first frequency conversion treatment, and the thus-converted signal is further subjected to a frequency conversion treatment performed at the transmission end, thus producing a second IF. The transmission signal is subjected to a third frequency conversion treatment performed at the receiving end, and the thus-converted signal is further subjected to a fourth frequency conversion treatment. As a result, an arbitrary second or third intermediate frequency can be set, and image frequencies can be prevented from falling into the group of radio frequencies (RFs).

So long as the second IF frequency F1 and the third IF frequency F2 assumes the frequency defined in (20) or (21), in practice harmonics of the second IF frequency F1, i.e., 4·F1, 5·F1, 6·F1, and 7·F1, do not affect radio signals of existing sub-bands within C-band, and therefore the signal-to-noise ratio of the receiver can be improved.

Further, so long as the second IF F1 and the third IF F2 assume the frequency defined in (20) or (21), three bands, i.e., the transmission radio frequency (RF) signal band, the local frequency channel band, and the image frequency band, are separated from one another without overlap. Further, the receiver can receive a signal while these three bands are separated from one another.

As a result, the transmitter requires only one type of band-pass filter having a pass-band for permitting passage of a plurality of radio frequencies (RF), thus eliminating the need for a band-pass filter for each radio frequency (RF) channel.

Similarly, the receiver also requires only one type of band-pass filer having a pass-band corresponding to the channel of a signal transmitted from an opposing transmitter, thus eliminating the need for a band-pass filter for each radio frequency (RF) channel.

Band-pass filters having different filtering characteristics have been required for individual radio transmission sections disposed within a multiplex radio transmitter, for individual receiving sections disposed within a multiplex radio receiver, and for repeaters. In contrast, according to the first embodiment, even if a multiplex communications system is allocated several channels, a band-pass filter having common specifications can be used for the individual radio transmission sections disposed within another multiplex radio transmitter, for individual radio receiving sections disposed within another multiplex radio receiver, or for repeaters, thus promoting common use of members. In this connection, the cost of a multiplex radio transmitter can be reduced.

(A1) Modification of the First Embodiment

In the first embodiment, a repeater disposed at the transmission end is not equipped with a radio receiving unit, and a repeater disposed at the receiving end is not equipped with a radio transmission unit. However, each of these repeaters may be configured so as to have both a radio transmission unit and a radio receiving unit.

Figure 16:
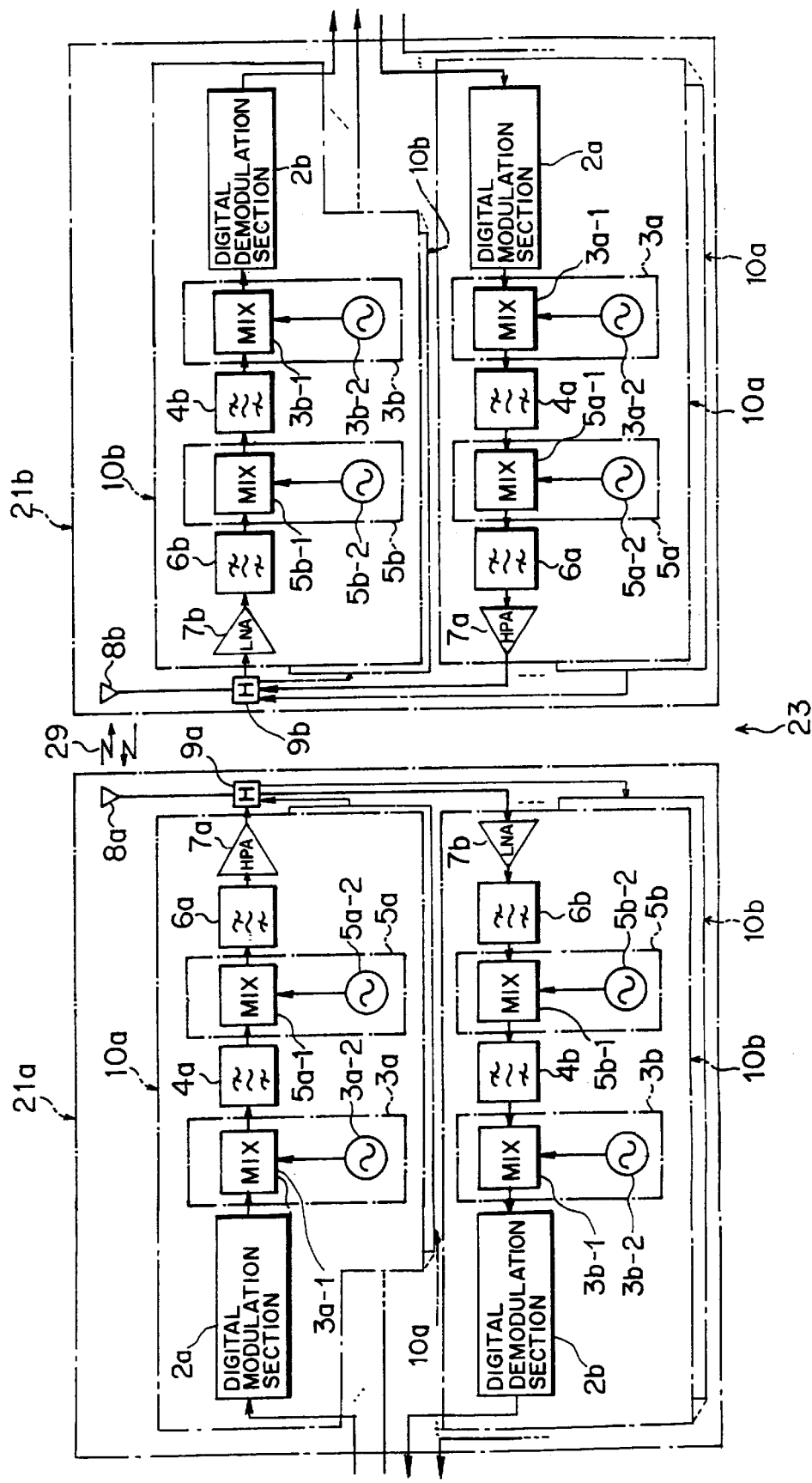
FIG. 16 is a schematic diagram showing the entire configuration of a trunk multiplex transmission/receiving system which employs a digital modulation/demodulation scheme according to a modification of the first embodiment.

In such a case, as shown in FIG. 16, a digital modulation type trunk multiplex transmission/receiving system 23, in which each of transmission and receiving stations has a radio transceiver unit, relays multiplexed trunk signal data (STM-1) between synchronous multiplex repeaters or between a synchronous multiplex repeater and a transmission-end apparatus. The trunk multiplex transmission/receiving system 23 comprises a multiplex radio transceiver 21a, a multiplex radio transceiver 21b, and a radio propagation path 29.

Each of the multiplex radio transceivers 21a, 21b has the plurality of radio transmission sections 10a corresponding to a plurality of channels and the plurality of radio receiving sections 10b corresponding to the plurality of channels. The multiplex radio transceivers 21a and 21b are disposed so as to oppose each other. Further, the trunk multiplex transmission/receiving system 23 comprises eight frequency converters.

In the multiplex radio transceiver 21a, each radio transmission section 10a digitally modulates multiplexed trunk signal data (STM-1) received from another synchronous multiplex repeater or a transmission-end apparatus, through use of a plurality of channels having different frequencies. The thus-modulated signals are transmitted at C-band to a radio channel. Simultaneously, radio signals, which have been digitally modulated by individual radio transmission sections 10a of the counterpart multiplex radio transceiver 21b through use of other frequencies within the identical band, are received by radio receiving sections 10b of the multiplex radio transceiver 21a. The thus-received signals are digitally demodulated and are subjected to a baseband processing treatment, whereby STM-1 data are resent to another synchronous repeater or transmission-end apparatus. The multiplex radio transceiver 21a comprises the plurality of radio transmission sections 10a, the plurality of radio receiving sections 10b, the antenna 8a, the antenna diplexer 9a, and the baseband processing section (not shown).

Each of the individual radio transmission sections 10a of the multiplex radio transceiver 21a receives multiplexed trunk signal data (STM-1) sent from another synchronous multiplex repeater or a transmission-end apparatus. The thus-received signal data are digitally modulated by the digital modulation section 2a by way of the baseband processing section, whereby a first IF signal is output. The first frequency converter 3a up-converts the first IF signal to a second IF signal which is filtered out by the first band-pass filter 4a. The thus-filtered signal is up-converted to a radio frequency (RF) signal by means of a second frequency converter 5a. The thus-converted signal is then sent through an antenna at C-band to the radio channel by way of the second band-pass filter 6a, the high power amplifier 7a, and the antenna diplexer By way of the antenna 8a, the radio receiving sections 10b of the multiplex radio transceiver 21a receives the respective radio signals which have frequencies differing from the transmission frequencies of the multiplex radio transceiver 21a and which are transmitted at the identical band from the individual radio transmission sections 10a of the multiplex radio transmitter 21b disposed so as to oppose the multiplex radio transceiver 21a. The thus-received signals are passed through the seventh band-pass filter 6b by way of the antenna diplexer 9a and the low-noise amplifier 7b, thus filtering out image signals included in the signals. An output from the band-pass filter 6b is down-converted to a seventh IF signal, through use of the seventh frequency converter 5b. An output from the seventh frequency converter 5b is further down-converted to an eighth IF signal by means of the eighth frequency converter 3b, and an outputted from the eight frequency converter 3b is digitally demodulated by means of the digital demodulation section 2b, whereby the STM-1 data having been subjected to a baseband processing treatment are transmitted to another synchronous multiplex repeater or a transmission-end apparatus.

Similarly, by way of the individual radio receiving sections 10b, the multiplex radio transceiver 21b disposed so as to oppose the multiplex radio transceiver 21a receives the radio signals which are transmitted from the multiplex radio transceiver 21a after having been digitally modulated by individual radio transmission sections 10a and which have frequencies differing from the transmission frequencies of the multiplex radio transceiver 21a in the identical band. The thus-received radio signals are digitally demodulated and retransmitted to another synchronous multiplex repeater and a transmission-end apparatus. Concurrently, multiplexed trunk signal data (STM-1) transmitted from another synchronous multiplex repeater or a transmission-end apparatus are subjected to a baseband processing treatment. The signal data are then digitally demodulated by means of the individual radio transmission sections 10a, through use of a plurality of channels having different frequencies. The thus-modulated signals are transmitted to the radio channel at C-band. As is the case with the multiplex radio transceiver 21a, the multiplex radio transceiver 21 comprises the plurality of radio transmission sections 10a, the plurality of radio receiving sections 10b, the antenna 8a, the antenna diplexer 9a, and the baseband processing section (not shown).

The individual radio receiving sections 10b of the multiplex radio transceiver 21b are identical to the individual radio receiving sections 10b of the multiplex radio transceiver 21a. More specifically, by way of the antenna 8b, the individual radio receiving sections 10b receive radio signals transmitted from the individual radio transmission sections 10a of the opposing multiplex radio transceiver 21. The thus-received signals are passed through the third band-pass filter 6b by way of the antenna diplexer 9b and the low-noise amplifier 7b, thereby an image signal from the signals. The thus-removed image signal is down-converted into the third IF signal through use of the third frequency converter 5b, and the down-converted signal is further passed through the fourth band-pass filter 4b. An output from the fourth band-pass filter 4b is down-converted again through use of the fourth frequency converter 3b. The thus-converted signal is digitally demodulated by means of the digital demodulation section 2b and is subjected to a baseband processing treatment, thereby producing STM-1 data. The STM-1 data having been subjected to a baseband processing treatment are transmitted to another synchronous multiplex repeater or a transmission-end apparatus.

Further, the individual radio transmitting sections 10a of the multiplex radio transceiver 21b are identical to the individual radio transmitting sections 10a of the multiplex radio transceiver 21a. More specifically, the multiplexed trunk signal data (STM-1) transmitted from another synchronous multiplex repeater or a transmission-end apparatus are subjected to a baseband processing treatment. The signal data are then digitally modulated by means of the digital modulation section 2a, through use of a plurality of channels having different frequencies. A fifth IF signal outputted from the digital modulation section 2a is up-converted to a sixth IF signal by means of a fifth frequency converter 3a, and the thus-converted signal is filtered out by means of a fifth band-pass filter 4a. The signal is further up-converted to a radio frequency (RF) signal by means of a sixth frequency converter 5a. An outputted from the sixth frequency converter 5a is transmitted to the radio channel at C-band from the antenna 8b by way of the sixth band-pass filter 6a, the high power amplifier 7a, and the antenna diplexer 9b.

The transmission frequency employed by the individual radio transmission sections 10a of the multiplex radio transceiver 21 is different from that employed by the individual radio transmission sections 10b of the multiplex radio transceiver 21b. As in the case of the first embodiment, the frequencies are selected so as not to affect radio signals of existing sub-bands within C-band.

The radio diplexer 9a and the antenna diplexer 9b transmit a radio frequency (RF) signal outputted from the respective radio transmission sections 10a to the individual radio receiving section 10b without leakage and separate the received radio frequency (RF) signal so that the individual radio receiving sections 10b can receive the radio frequency signals without leakage.

The antenna 8a is connected to the respective radio transmission sections 10a by way of the antenna diplexer 9a. The radio frequency (RF)—which is outputted from each radio transmission section 10a and is digitally modulated—is sent to the radio channel 29 from the antenna 8a. The antenna 8a is also connected to each radio receiving section 10b, thus receiving the radio frequency (RF) signal.

In short, the antenna 8a serves as a transmission antenna shared among the radio transmission sections 10a and as a receiving antenna shared among the radio receiving sections 10b. Further, the antenna 8b is identical with the antenna 8a.

In FIG. 16, members which are assigned the same reference numerals as those used in the first embodiment are identical with or identical in function with those described in the first embodiment, and hence their further descriptions will be omitted here.

In the present embodiment, there is employed a digital modulation/demodulation scheme in which a baseband signal is digitally modulated and demodulated. Accordingly, multiplexed trunk signal data (STM-1) can be bidirectionally sent and received.

The multiplex radio transceiver 21a acquires multiplexed trunk signal data (STM-1) and digitally modulates the signal data through a baseband processing treatment, by means of each radio transmission section 10a. The digitally modulated signal is up-converted to the second IF signal by means of the first frequency converter. The thus-converted signal is further up-converted to a radio frequency (RF) signal by means of the second frequency converter. The radio frequency signal is then transmitted. The radio receiving section 10b of the multiplex radio transceiver 21b receives the thus-transmitted signal. The signal is down-converted to the third IF signal by means of the third frequency converter, and the third IF signal is further down-converted to the fourth IF signal by means of the fourth frequency converter. The fourth IF signal is digitally demodulated and is subjected to a baseband processing treatment. The signal is then transmitted to another synchronous multiplex repeater or a transmission-end apparatus.

The multiplex radio transceiver 21b acquires multiplexed trunk signal data (STM-1) and digitally modulates the signal data through a baseband processing treatment by means of each radio transmission section 10a. The digitally modulated signal is up-converted to the sixth IF signal, by means of the fifth frequency converter. The thus-converted signal is further up-converted to a radio frequency (RF) signal by means of the sixth frequency converter. The radio frequency signal is then transmitted. The radio receiving section 10b of the multiplex radio transceiver 21a receives the thus-transmitted signal. The signal is down-converted to the seventh IF signal by means of the seventh frequency converter, and the seventh IF signal is further down-converted to the eighth IF signal by means of the eighth frequency converter. The eighth IF signal is digitally demodulated and subjected to a baseband processing treatment. Multiplexed trunk signal data (STM-1) are extracted from the thus-processed signal and transmitted to another synchronous multiplex repeater or a transmission-end apparatus.

The bidirectional transmission of data mentioned above enables significant improvement in the efficiency of transmission of multiplexed trunk signal data.

Without regard to the frequency of a primary modulation output, an arbitrary second or third intermediate frequency can be set.

Further, so long as the second or third intermediate frequency is set to the value selected in the first embodiment, harmonics of the intermediate frequency F1, i.e., 4·F1, 5·F1, 6·F1, and 7·F1, do not intercept existing sub-bands within C-band.

Further, so long as the second and third intermediate frequencies are set to the value selected in the first embodiment, three bands, i.e., the transmission radio frequency (RF) signal band, the local frequency channel band, and the image frequency band, are separated from one another without overlap. Accordingly, in practice, the radio frequency (Rf) signal can be prevented from colliding with the image frequency.

As a result, the two multiplex radio transceivers which are disposed so as to oppose each other require only one type of transmission band-pass filter having a pass-band for permitting passage of a plurality of radio frequency (RF) signals, thus eliminating a need to filter out a transmission signal for each radio frequency (RF) channel.

Further, the two multiplex radio transceivers require only one type of receiving band-pass filter having a pass-band for permitting passage of a plurality of radio frequency (RF) signals, thus eliminating a need to filter out a received signal for each radio frequency (RF) channel.

In short, band-pass filters having different filtering characteristics have been required for individual radio transmission sections disposed within a multiplex radio transmitter, for individual receiving sections disposed within a multiplex radio receiver, and for repeaters. In contrast, according to the modification of the first embodiment, even if a multiplex communications system is allocated several channels, a band-pass filter having common characteristics can be used for the individual radio transmission sections disposed within another multiplex radio transmitter, for individual radio receiving sections disposed within another multiplex radio receiver, or for repeaters, thus promoting common use of members. In this connection, the cost of a multiplex radio transmitter can be reduced.

(B) Description of a Second Embodiment

In the first embodiment and its modification set forth, the transmission section of the radio repeater digitally modulates multiplexed trunk signal data (STM-1), and the digitally-modulated signal is up-converted in two steps and then sent to the radio propagation path 29. In contrast, the receiving section of the opposing radio repeater down-converts a received radio frequency (RF) signal in two steps. The thus-converted signal is digitally demodulated and is subjected to a baseband processing treatment, whereby multiplexed trunk signal data (STM-1) are obtained.

In contrast, an analog modulation/demodulation scheme may be alternatively be used.

Figure 17:
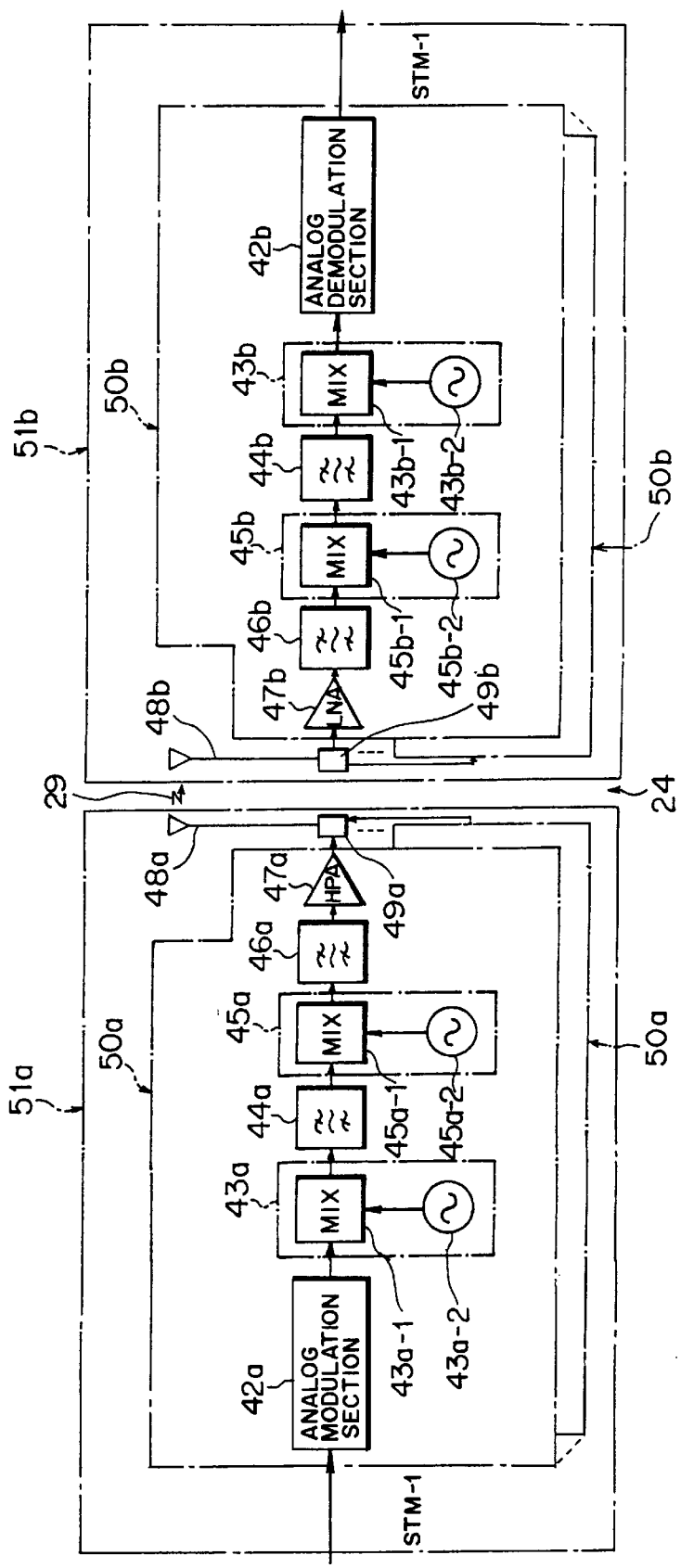
FIG. 17 is a schematic diagram showing the entire configuration of a trunk multiplex transmission/receiving system which employs an analog modulation scheme according to a second embodiment.

FIG. 17 is a circuit diagram showing the configuration of a trunk multiplex radio transmission/receiving system using an analog modulation scheme according to a second embodiment of the present invention. A trunk multiplex radio transmission/receiving system 24 using an analog modulation scheme relays multiplexed trunk signal data (STM-1) between synchronous multiplex repeaters or between a synchronous multiplex repeater and a transmission-end apparatus. The trunk multiplex radio transmission/receiving system 24 comprises a multiplex radio transmitter 51a which transmits a plurality of channel signals having different frequencies while converting them into a multiplexed signal; a multiplex radio receiver 51b which receives a plurality of multiplexed channel signals having different frequencies; and a radio propagation path 29.

Here, the multiplex radio transmitter 51a modulates multiplexed trunk signal data (STM-1) received from another synchronous multiplex repeater or a transmission-end apparatus in an analog fashion and transmits the thus-modulated data to the radio propagation path 29. The multiplex radio transmitter 51a comprises a plurality of radio transmission sections 50a provided so as to correspond to respective channels; an antenna 48a; an antenna diplexer 49a; and a baseband processing section (not shown).

Each radio transmission section 50a subjects the multiplexed trunk signal data (STM-1) to a baseband processing treatment and modulates the thus-processed data in an analog fashion. The transmission section 50a comprises an analog modulation section 42a, a first frequency converter 43a, a first band-pass filter 44a, a second frequency converter 45a, a second band-pass filter 46a, and a high power amplifier 47a.

Figure 18:
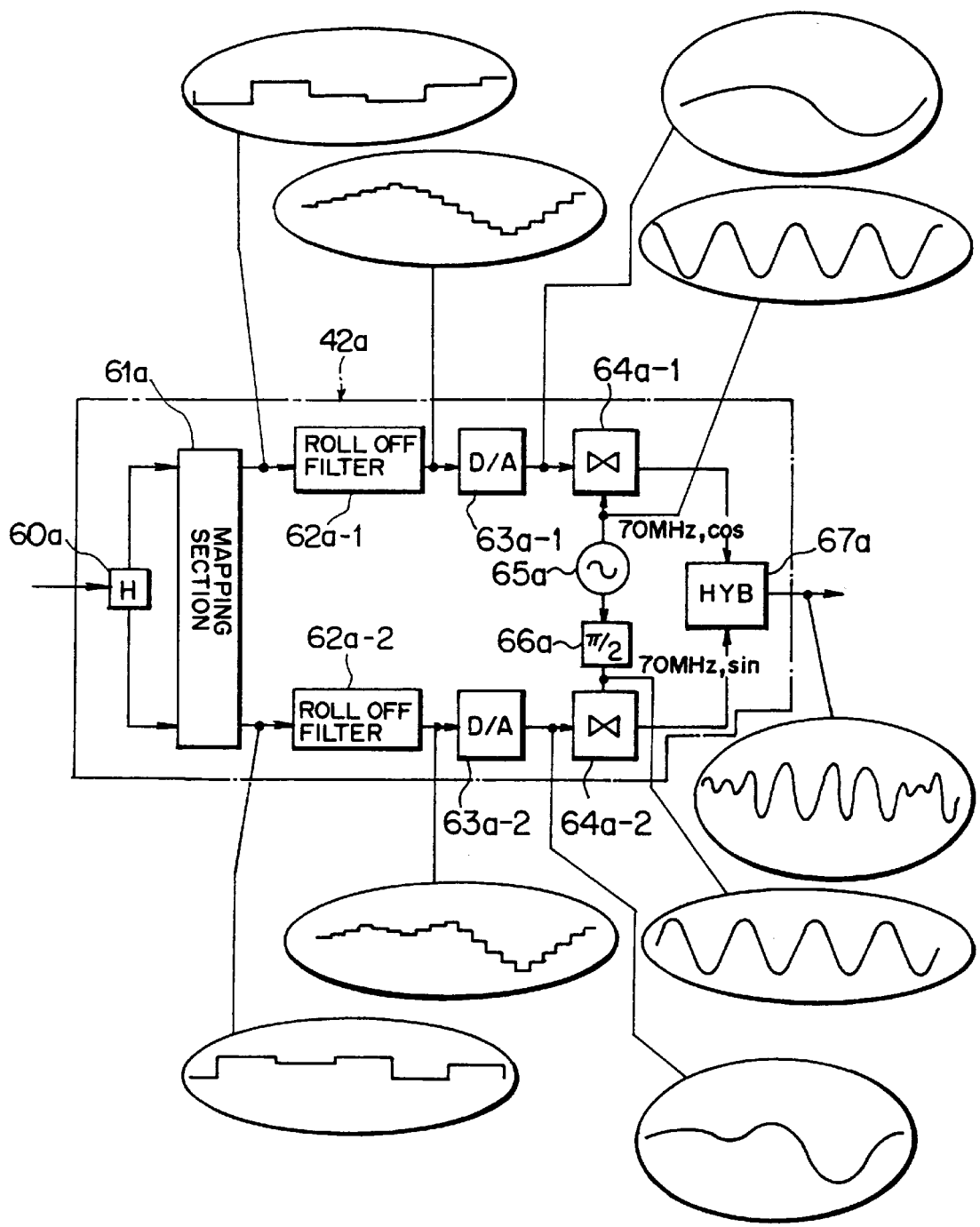
FIG. 18 is a block diagram showing an analog modulation section according to the second embodiment.

The analog modulation section 42a modulates the STM-1 data, which have been subjected to a baseband processing treatment, in an analog fashion and sends the thus-modulated signal to the radio channel. As shown in FIG. 18, the analog modulation section 42a comprises a hybrid section 60a, a mapping section 61a, a roll-off filter 62a-1, a roll-off filter 62a-2, a mixer 64a-1, a mixer 64a-2, a local oscillator 65a, a 90-degree phase shifter 66a, and a hybrid section 67a.

The hybrid section 60a converts the STM-1 data into parallel data through serial-to-parallel conversion.

The mapping section 61a maps data bits of the I- and Q-channels into a constellation (or an arrangement of signal points) in groups of data bits-which are equal in number to a multivalued modulation number-at a modulation rate "w".

The roll-off filter 62a-1 processes the I-channel data at a rate (4·W) which is four times the modulation rate "w", in order to prevent intersymbol interference from arising at the receiving end. Similarly, the roll-off filter 62a-2 processes the Q-channel signal at a rate (4·W) which is four times the modulation speed "w".

The digital-to-analog converter 63a-1 converts a digital outputted from the roll-off filter 62a-1 into an analog value. Similarly, the digital-to-analog converter 63a-2 converts a digital outputted from the roll-off filter 62a-2 into an analog value.

The mixer 64a-1 mixes an I-channel analog signal outputted from the digital-to-analog converter 63a-1 with an analog cosine signal outputted from the local oscillator 65a. Similarly, the mixer 64a-2 mixes a Q-channel analog signal outputted from the digital-to-analog converter 63a-2 with an analog sine signal outputted from the 90-degree phase shifter 66a. The oscillation frequency of the local oscillator 65a is 70 MHz, as specified by ITU-R. In contrast with digital modulation, analog modulation theoretically enables selection of an arbitrary value as the oscillation frequency.

Figure 20A:
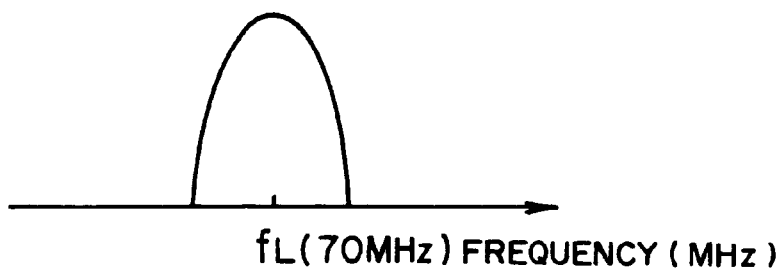
FIG. 20(a) shows a spectrum of an outputted from the analog modulation section disposed at the transmission send according to the second embodiment.

The hybrid section 67a merges the I-channel data outputted from the mixer 64a-1 and the Q-channel data outputted from the mixer 64a-2 into one signal. FIG. 20(a) shows an output spectrum of the thus-merged signal which appears in the vicinity of the oscillation frequency $f_L$.

The first frequency converter 43a up-converts a first IF signal outputted from the analog modulation section 42a into a second IF signal which is higher in frequency than the first IF signal by only the frequency of a first local signal of the first frequency converter. In the first frequency converter 43a, a mixer 43a-1 mixes the first local signal outputted from a first local signal oscillator 43a-2 into the first IF signal outputted from the analog modulation section 42a.

Figure 20B:
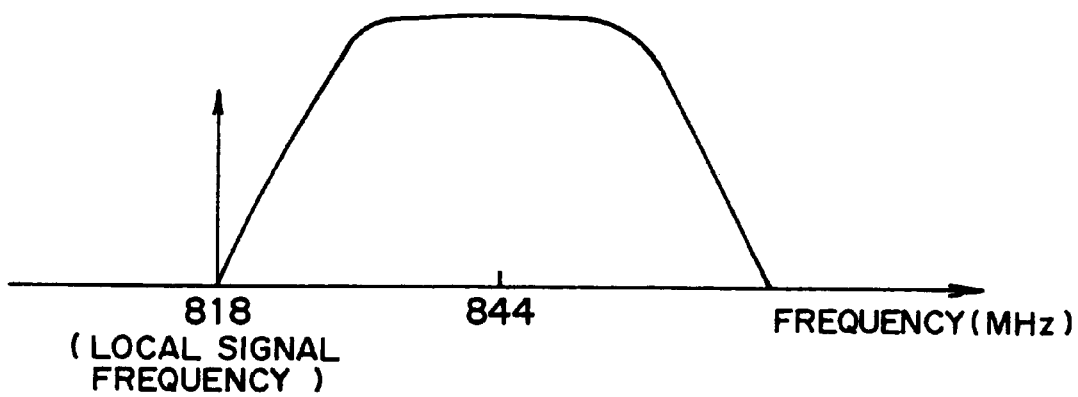
FIG. 20(b) shows the band-pass characteristics of a first band-pass filter disposed at the transmission end or those of a fourth band-pass filter disposed at the receiving end according to the second embodiment.

The first band-pass filter 44a eliminates a frequency component of the first local signal outputted from the first frequency converter 43a, thus permitting passage of only the second IF signal. FIG. 20(b) shows the band-pass characteristics of the first band-pass filter 44a. As shown in this drawing, the first band-pass filter 44a permits passage of only the frequency of 844 MHz, which is the frequency of the second IF signal, but prevents the passage of the first local signal whose frequency (818 MHz) is lower than that of the second IF signal by about 26 MHz.

The second frequency converter 45a outputs a radio frequency (RF) signal by up-converting an outputted from the first band-pass filter 44a through use of a second local signal having eight kinds of frequencies. A mixer 45a-1 mixes a second local signal outputted from a second local signal oscillator 45a-2 with the second IF signal outputted from the first band-pass filter 44a.

Figure 21:
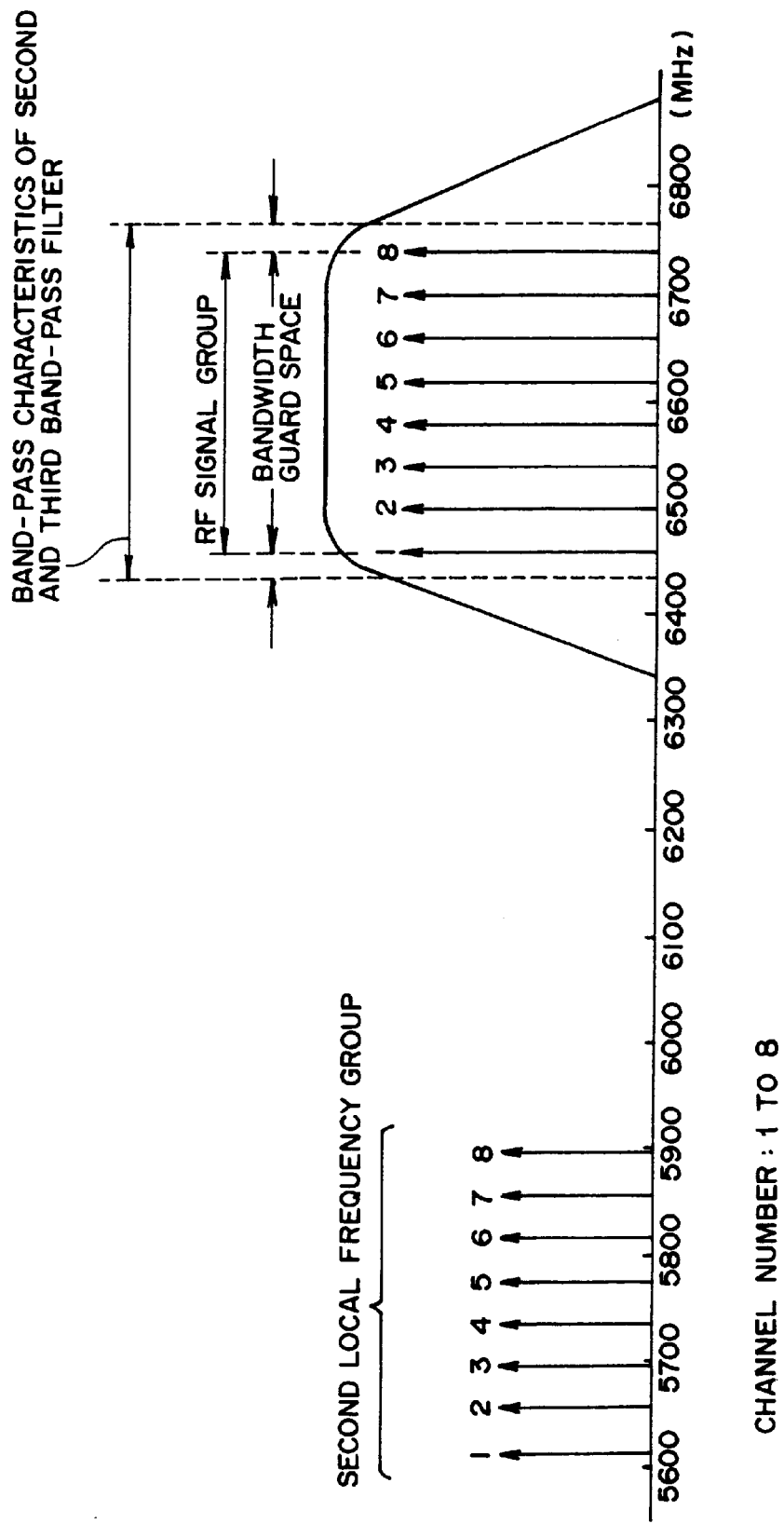
FIG. 21 shows frequency allocation of a radio frequency (RF) signal group and a local signal group and the band-pass characteristics of a second band-pass filter disposed at the transmission end or those of a third band-pass filter disposed at the receiving end according to the second embodiment.

For example, FIG. 21 shows allocation of a group of frequencies of the second local signal and radio frequencies (RF), through use of the U6G band as a sub-band and through use of an up-link. As shown in the drawing, the group of radio frequency (RF) signals and the group of frequencies of the local signal are not superimposed on one another but are separated in frequency from one another.

Further, the second band-pass filter 46a has at least a band-pass width corresponding to radio frequency signals of a plurality of channels to be used and filters the radio frequency (RF) signal outputted from the second frequency converter 45a, thus eliminating a frequency component of the second local signal.

The band-pass characteristics of the second band-pass filter 46a shown in FIG. 21 are such that the center frequency lies in the microwave band, and the second band-pass filter has a band-pass width of 340 MHz. Specifically, the pass-band width corresponds to the sum of the radio frequency (RF) group of 280 MHz and the bandwidth guard space of 30 MHz provided on either side thereof. As a result, individual channels of the group of radio frequency (RF) signals can be collectively passed through use of only one type of second band-pass filter having broad band-pass characteristics, without need for a second band-pass filter having band-pass characteristics for each radio frequency (RF) signal channel.

The high power amplifier 47a amplifies a radio frequency (RF) signal outputted from the second band-pass filter 46a with high efficiency and low distortion.

The antenna 48a is connected to each of the radio transmission sections 50a via the antenna diplexer 49a and sends the analog-modulated radio frequency (RF) signals outputted from the high power amplifier 47a.

In contrast, the multiplex radio receiver 51b demodulates in an analog fashion the radio frequency (RF) signal, which has passed through the radio propagation path 29, and outputs STM-1 data after having subjected the demodulated signal to a baseband processing treatment. To this end, the receiver 51b shown in FIG. 17 comprises an antenna 48b, a plurality of radio receiving sections 50b provided so as to correspond to the individual channels, and an antenna diplexer 49b.

The antenna 48b is connected to each of the radio receiving sections 50b via the antenna diplexer 49b and receives a radio frequency (RF) signal. More specifically, the antenna 48b is constituted as an antenna to be shared among the radio receiving sections 50b.

Each radio receiving section 50b digitally demodulates the radio frequency (RF) signal received by the antenna 48b and outputs STM-1 data after having subjected the RF signal to a baseband processing treatment. The radio receiving section 50b comprises a low-noise amplifier 47b, a third band-pass filter 46b, a third frequency converter 45b, a fourth band-pass filter 44b, a fourth frequency converter 43b, and an analog demodulator 42b.

The low-noise amplifier 47b amplifies the radio frequency (RF) signal received by the antenna 48b with little noise.

The third band-pass filter 46b has at least a band-pass width corresponding to radio frequency signals of a plurality of channels to be used. The third band-pass filter 46b eliminates a frequency component of the image signal from the radio frequency (RF) signal outputted from the low-noise amplifier 47b. The third band-pass filter 46b has band-pass characteristics such as those shown in FIG. 21. The third IF signal used in the receiver has a frequency of 844 MHz.

The third frequency converter 45b down-converts the frequency of the radio frequency (RF) signal outputted from the third band-pass filter 46b and a third local signal outputted from the third local oscillator 45b-2, through use of the mixer 45b-1, thereby outputting a third IF signal whose frequency is lower than that of the radio frequency (RF) signal by the frequency of the third local signal.

The fourth band-pass filter 44b eliminates an image signal from the outputted from the third frequency converter 45b, thus permitting passage of only the third IF signal. As shown in FIG. 20(b), the fourth band-pass filter 44b permit passage of only a frequency of 844 MHz, which corresponds to the third IF signal, but prevents passage of the first local signal (818 MHz), whose frequency is lower than that of the third IF signal by about 26 MHz.

The fourth frequency converter 43b down-converts the third IF signal outputted from the fourth band-pass filter 44b into a fourth IF signal whose frequency is lower than that of the third IF signal. A mixer 43b-1 mixes a fourth local signal outputted from a fourth local signal oscillator 43b-2 with the third IF signal outputted from the fourth filter 44b.

Figure 19:
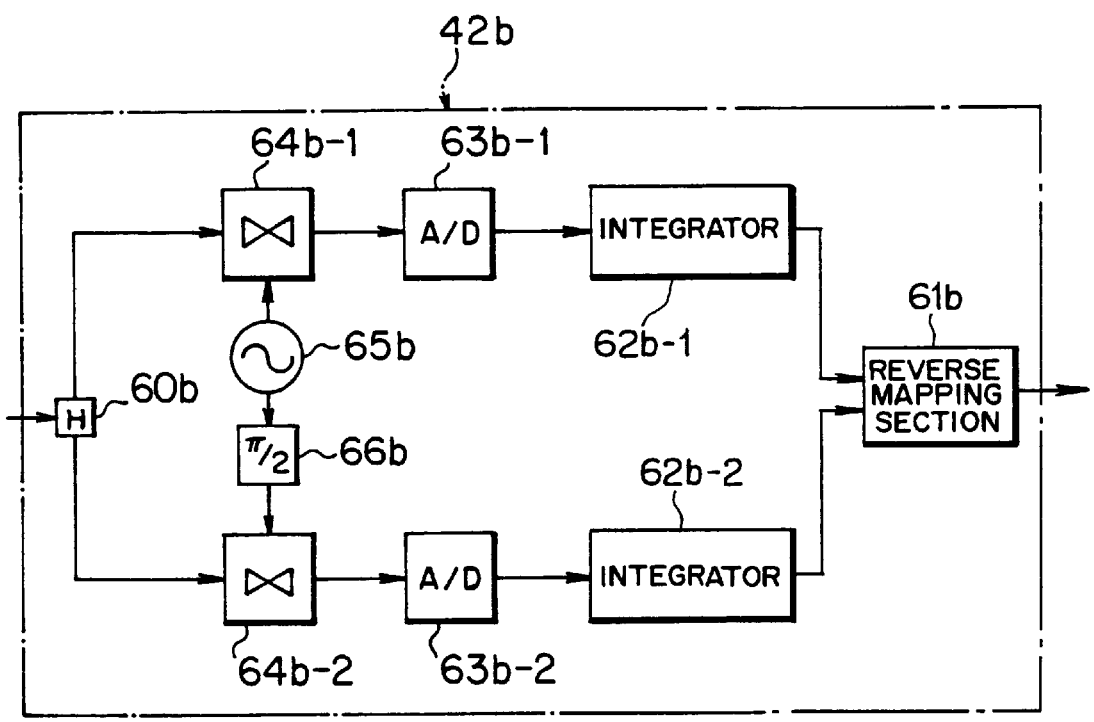
FIG. 19 is a block diagram showing an analog demodulation section according to the second embodiment.

The digital demodulation section 42b demodulates in an analog fashion the outputted from the fourth frequency converter 43b and comprises, as shown in FIG. 19, a hybrid section 60b, a local oscillator 65b, a 90-degree phase shifter 66b, a mixer 64b-1, a mixer 64b-2, an analog-to-digital converter 63b-1, an analog-to-digital converter 63b-2, an integrator 62b-1, an integrator 62b-2, and a reverse mapping section 61b.

The hybrid section 60b separates an outputted from the fourth frequency converter section 43b.

The local oscillator 65b is made up of an analog oscillator of 70 MHz, and the 90-degree phase shifter 66b shifts the phase of a signal outputted from the local oscillator 65b by 90 degrees.

The mixer 64b-1 multiplies the I-channel data outputted from the hybrid section 60b by an outputted from the local oscillator 65b, thereby causing the I-channel data to fall within a baseband. Similarly, the mixer 64b-2 multiplies the Q-channel data outputted from the hybrid section 60b by an outputted from the 90-degree phase shifter 66b, thus causing the Q-channel data to fall within the baseband.

Through analog-to-digital conversion, the analog-to-digital converter 63b-1 converts the fourth IF signal received from the mixer 64b-1. Similarly, through analog-to-digital conversion, the analog-to-digital converter 63b-2 converts the fourth IF signal received from the mixer 64b-2.

The integrator 62b-1 extracts the bit position of demodulated data regarding the modulation rate "v" from a bit string formed by sampling an outputted from the analog-to-digital converter 63b-1 at high speed. Similarly, the integrator 63b-2 extracts the bit position of demodulated data regarding the modulation rate "v" from a bit string formed by sampling an outputted from the analog-to-digital converter 63b-2 at high speed.

The reverse mapping section 61b decodes the amplitude and phase of bits which have an amplitude and are outputted from the integrators 62b-1 and 62b-2, thereby reproducing original data in groups of data bits which are equal in number to the multivalued modulation number.

Full duplex communication is established between the two opposing repeaters over the radio propagation path 29 through use of a required number of channels. Of these channels, one type of channel is used for a backup purpose. A master repeater transmits a radio signal at, e.g., a downlink transmission frequency X which is one of seven types of channels. A slave repeater which opposes the master repeater receives the thus-transmitted signal having the transmission frequency X. Simultaneously, the slave repeater transmits a signal at an uplink transmission frequency X', and the master repeater which opposes the slave repeater receives the signal having the transmission frequency X'.

Specifically, the transmitter and the receiver each select one channel from the eight types of channels, and they become symmetrical to each other in terms of band-pass characteristics.

In this way, in a case where a frequency of 844 MHz is selected as the second and third IF frequencies, three bands, i.e., the radio frequency (RF) signal band, the local signal band, and the image frequency band, can be allocated as shown in FIG. 21 in such a way as not to overlap one another. As a result, the local signal band is separated from the group of radio frequency (RF) signals, and hence the transmitter requires only one type of band-pass filter capable of permitting collective passage of the plurality of radio frequency (RF) signals. There can be used common members in the radio transmission sections disposed within the multiplex radio transmitter or in repeaters. Therefore, there is no need for individual band-pass filters having different band-pass characteristics, which would otherwise be provided for individual radio transmission sections or repeaters.

Similarly, the receiver does not require in its front-end stage filters having band-pass characteristics corresponding to the channels used for individual radio receiving sections or repeaters. The receiver requires only one type of band-pass filter, thus enabling use of common members for individual radio receiving sections in the multiplex radio receiver or for repeaters.

As mentioned above, according to the second embodiment, after having performed the first frequency conversion through analog modulation, the transmitter converts, e.g., the second IF signal, into an optimum second IF signal of 844 MHz obtained in the first embodiment. Further, after having performed the fourth frequency conversion by converting the third IF signal into an optimum third IF signal of 844 MHz obtained in the first embodiment, the receiver demodulates the frequency-converted signal in an analog fashion, thus enabling setting of the second or third intermediate frequency to an arbitrary value. In practice, an image frequency is prevented from falling within the radio frequency (RF) signal.

Harmonics of the second and third intermediate frequencies F1, i.e., 4·F1, 5·F1, 6·F1, and 7·F1, do not affect radio signals of existing sub-bands within C-band.

Further, three bands, i.e., the transmission radio frequency (RF) signal band, the local frequency channel band, and the image frequency band, are separated from one another without overlap. Similarly, these three bands are separated from one another even in the receiver.

As a result, the multiplex radio transmitter requires only one type of band-pass filter having a pass-band for permitting passage of a plurality of radio frequencies (RF), thus eliminating a need to filter a signal for each radio frequency (RF) channel as well as a need to prepare band-pass filters having different band-pass characteristics for respective transmission sections or for repeaters.

Similarly, the multiplex radio receiver requires only one type of band-pass filter having a pass-band for permitting passage of a plurality of radio frequencies (RF), thus eliminating a need to filter a signal for each radio frequency (RF) channel as well as to prepare band-pass filters having different band-pass characteristics for respective receiving sections or for repeaters.

In short, band-pass filters having different filtering characteristics have been required for individual radio transmission sections disposed within a multiplex radio transmitter, for individual receiving sections disposed within a multiplex radio receiver, and for repeaters. In contrast, according to the second embodiment, even if a multiplex communications system is allocated several channels, a band-pass filter having common specifications can be used for the individual radio transmission sections disposed within another multiplex radio transmitter, for individual radio receiving sections disposed within another multiplex radio receiver, or for repeaters, thus promoting common use of members. In this connection, the cost of a multiplex radio transmitter can be reduced.

(B1) Modification of the Second Embodiment

In the second embodiment, a repeater disposed at the transmission end is not equipped with a radio receiving unit, and a repeater disposed at the receiving end is not equipped with a radio transmission unit. However, each of these repeaters may be configured so as to have both a radio transmission unit and a radio receiving unit.

Figure 22:
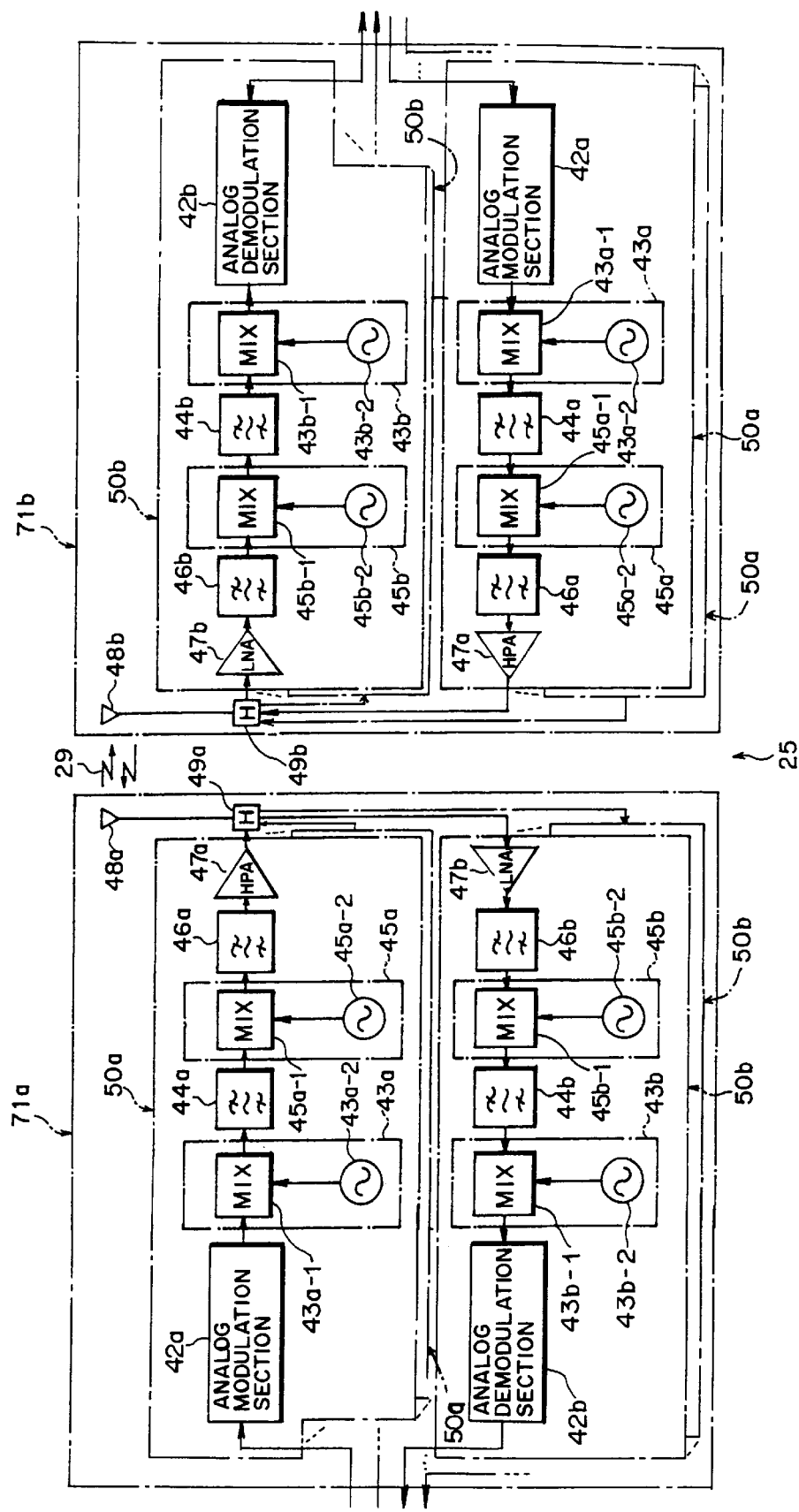
FIG. 22 is a schematic diagram showing a trunk multiplex transmission/receiving system using an analog modulation/demodulation scheme according to a modification of the second embodiment.
Figure 23:
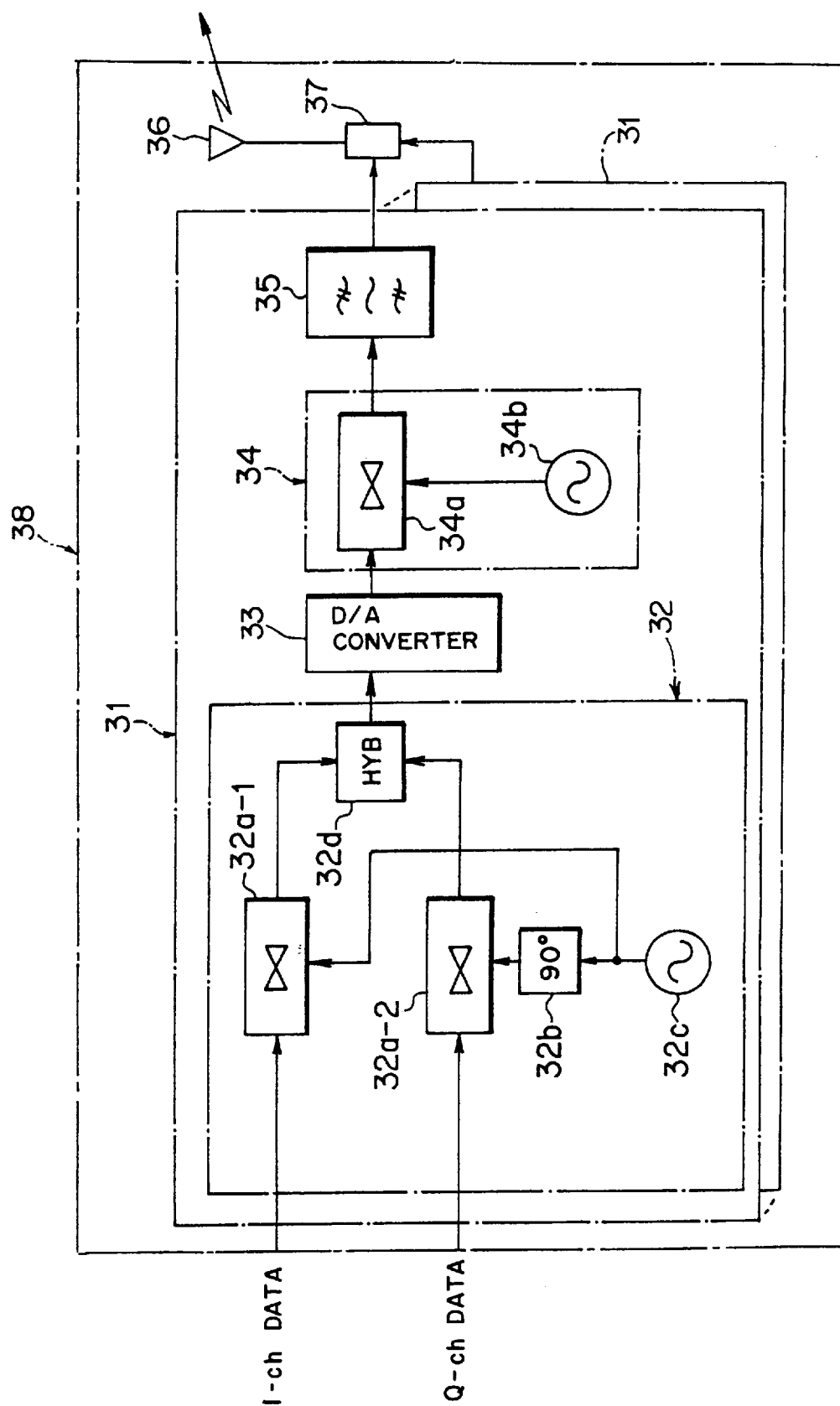
FIG. 23 is a block diagram showing the principal elements of a transmission section of a multiplex radio transmitter.
Figure 24:
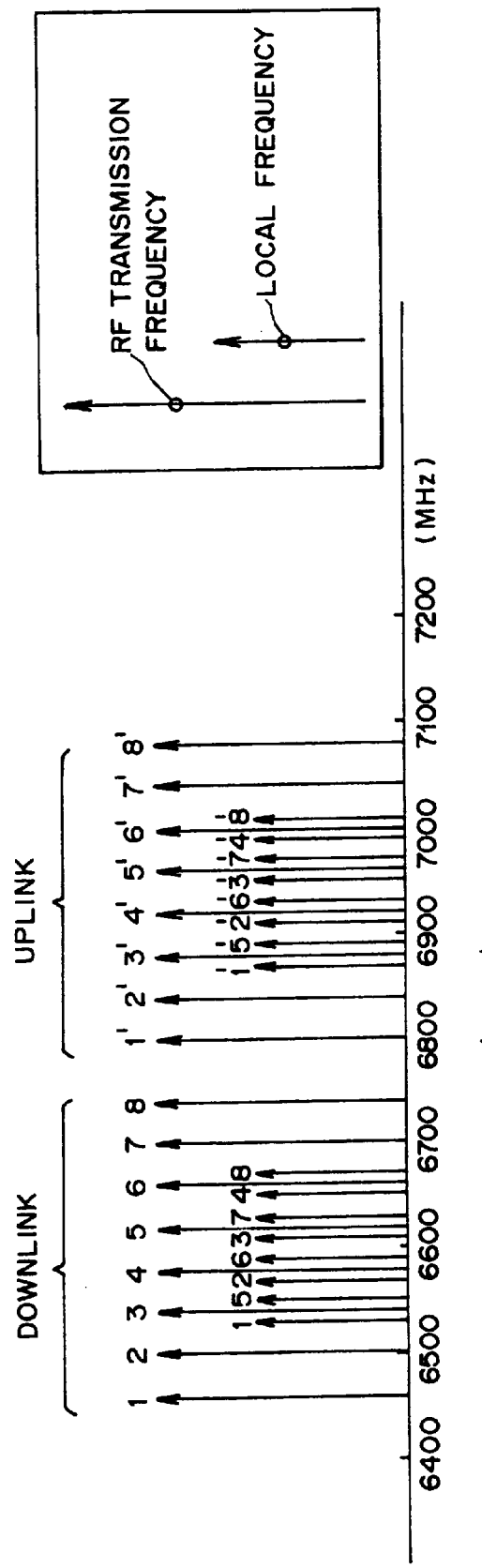
FIG. 24 shows allocation of a radio frequency (RF) signal group and a local signal group of a multiplex transmitter.

In such a case, the transmitter and receiver each have a configuration such as that shown in FIG. 22, wherein a digital baseband modulation section shown in FIG. 16 is changed to an analog baseband modulation section. An analog type trunk multiplex radio transmission/receiving system 25, in which the transmitter and the receiver each have a radio transceiver, relays multiplexed trunk signal data (STM-1) between synchronous multiplex repeaters or between a synchronous multiplex repeater and a transmission-end apparatus. The trunk multiplex transmission/receiving system 25 comprises a multiplex radio transceiver 71a, a multiplex radio transceiver 71b, and a radio propagation path 29.

Each of the multiplex radio transceivers 71a, 71b has the plurality of radio transmission sections 50a corresponding to a plurality of channels and the plurality of radio receiving sections 50b corresponding to the plurality of channels. Further, the trunk multiplex transmission/receiving system 25 comprises eight frequency converters.

In the multiplex radio transceiver 71a, each radio transmission section 50a subjects to a baseband processing treatment multiplexed trunk signal data (STM-1) received from another synchronous multiplex repeater or a transmission-end apparatus and modulates the thus-processed signal in an analog fashion, through use of a plurality of channels having different frequencies. The thus-modulated signals are transmitted to a radio channel such as a C-band channel. Simultaneously, radio signals, which have been modulated in an analog fashion by individual radio transmission sections 50a of the counterpart multiplex radio transceiver 71b through use of other frequencies within the same band, are received by radio receiving sections 50b of the multiplex radio transceiver. The thus-received signals are demodulated in an analog fashion and are subjected to a baseband processing treatment, whereby STM-1 data are resent to another synchronous repeater or transmission-end apparatus. The multiplex radio transceiver 71a comprises the plurality of radio transmission sections 50a, the plurality of radio receiving sections 50b, the antenna 48a, and the antenna diplexer 49a.

Each of the individual radio transmission sections 50a of the multiplex radio transceiver 71a receives multiplexed trunk signal data (STM-1) sent from another synchronous multiplex repeater or a transmission-end apparatus. The thus-received signal data are subjected to a baseband processing treatment and are modulated to an analog signal by means of the analog modulation section 42a. The first frequency converter 43a up-converts the first IF signal outputted from the analog modulation section 42a to a second IF signal which is filtered out by the first band-pass filter 44a. The thus-filtered signal is up-converted to a radio frequency (RF) signal by means of a second frequency converter 45a. The thus-converted signal is then sent to a radio channel from the antenna 48a by way of the second band-pass filter 46a, the high power amplifier 47a, and the antenna diplexer 49a.

By way of the antenna 48a, the radio receiving sections 50b of the multiplex radio transceiver 71a receives the respective radio signals which have frequencies differing from the transmission frequencies of the multiplex radio transceiver 71a and which are transmitted at the identical band from the individual radio transmission sections 50a of the multiplex radio transceiver 71b disposed so as to oppose the multiplex radio transceiver 71a. The thus-received signals are passed through the seventh band-pass filter 46b by way of the antenna diplexer 49a and the low-noise amplifier 47b, thus filtering out image signals included in the signals. An outputted from the band-pass filter 46b is down-converted to the seventh IF signal, through use of the seventh frequency converter 45b. An outputted from the seventh frequency converter 45b is further down-converted to the eighth IF signal by means of the eighth frequency converter 44b, and an outputted from the eight frequency converter 43b is demodulated in an analog fashion by means of the analog demodulation section 42b. The thus-demodulated signal is subjected to a baseband processing treatment, whereby the STM-1 data are transmitted to another synchronous multiplex repeater or a transmission-end apparatus.

Similarly, in the multiplex radio transceiver 71b disposed so as to oppose the multiplex radio transceiver 71a, each radio transmission section 50b receives a radio signal, which is modulated in an analog fashion and is sent by means of the radio transmission section 50a of the multiplex radio transceiver 71a, and demodulates the received signal in an analog fashion. The thus-demodulated signal is resent to another synchronous multiplex repeater or a transmission-end apparatus. Simultaneously, multiplexed trunk signal data (STM-1) transmitted from another synchronous multiplex repeater or a transmission-send apparatus are subjected to a baseband processing treatment, and the thus-processed data are demodulated in an analog fashion by means of the respective radio receiving sections 50a, through use of a plurality of channels having different frequencies. The thus-demodulated data are sent to a radio channel. The multiplex radio transceiver 71b comprises the plurality of radio transmission sections 50a, the plurality of radio receiving sections 50b, an antenna 48b, and an antenna diplexer 49b in the same manner as does the multiplex radio transceiver 71a.

By way of the antenna 48b, as in the case of the radio receiving section 50b of the multiplex radio transceiver 71a, the radio receiving sections 50b of the multiplex radio transceiver 71b receives the respective radio signals which have frequencies differing from the transmission frequencies of the multiplex radio transceiver 71b and which are transmitted from the individual radio transmission sections 50a of the multiplex radio transceiver 71a disposed so as to oppose the multiplex radio transceiver 71b. The thus-received signals are passed through the third band-pass filter 46b by way of the antenna diplexer 49b and the low-noise amplifier 47b, thus filtering out image signals included in the signals. An outputted from the band-pass filter 46b is down-converted to the third IF signal, through use of the third frequency converter 45b. An outputted from the third frequency converter 45b is passed through the fourth band-pass filter 44b, thus down-converting an outputted from the band-pass filter 44b to the fourth IF signal. An outputted from the fourth frequency converter 44b is demodulated in an analog fashion by means of the analog demodulation section 42b. The thus-demodulated signal is subjected to a baseband processing treatment, whereby the STM-1 data are transmitted to another synchronous multiplex repeater or a transmission-end apparatus.

As in the case of the radio transmission section 50a of the multiplex radio transceiver 71b, each of the individual radio transmission sections 50a of the multiplex radio transceiver 71b receives multiplexed trunk signal data (STM-1) sent from another synchronous multiplex repeater or a transmission-end apparatus. The thus-received signal data are subjected to a baseband processing treatment and are modulated to an analog signal by means of the analog modulation section 42a. The fifth frequency converter 43a up-converts the fifth IF signal outputted from the analog modulation section 42a to the sixth IF signal. The sixth IF signal is filtered by means of the fifth band-pass filter 44a and is up-converted to a radio frequency (RF) signal by means of the sixth frequency converter 45a. The thus-converted signal is then sent to a radio channel at C-band from the antenna 48b by way of the sixth band-pass filter 46a, the high power amplifier 47a, and the antenna diplexer 49b.

In FIG. 22, the members assigned the reference numerals, which are the same as those used in the first embodiment, the modification of the first embodiment, and the second embodiment, designate analogous members or members having similar functions, and hence their further explanations will be omitted here.

The second local signal used in the radio transmission section is different in frequency from the sixth local signal used in the radio transmission section of the opposing multiplex radio transceiver. As in the case of the first embodiment, the frequencies are selected so as not to intercept other sub-bands within C-band. The third local signal used in the radio receiving section is different in frequency from the seventh local signal used in the radio transmission section of the opposing multiplex radio transceiver. The frequencies are selected so as not to intercept other sub-bands within C-band, as in the case of the first embodiment.

As mentioned above, according to the present modification, there is employed an analog modulation/demodulation scheme in which a baseband signal is modulated and demodulated in an analog fashion. Accordingly, multiplexed trunk signal data (STM-1) can be bidirectionally sent and received.

The multiplex radio transceiver 71a acquires multiplexed trunk signal data (STM-1) and modulates the signal data in an analog fashion, through a baseband processing treatment, by means of each radio transmission section 50a. The modulated signal is up-converted to the second IF signal by means of the first frequency converter. The thus-converted signal is further up-converted to a radio frequency (RF) signal by means of the second frequency converter. The radio frequency signal is transmitted. The radio receiving section 50b of the opposing multiplex radio transceiver 71b receives the thus-transmitted signal. The signal is down-converted to the third IF signal by means of the third frequency converter, and the third IF signal is further down-converted to the fourth IF signal by means of the fourth frequency converter. The fourth IF signal is demodulated in an analog fashion and is subjected to a baseband processing treatment. The signal is then transmitted to another synchronous multiplex repeater or a transmission-end apparatus.

The multiplex radio transceiver 71b acquires multiplexed trunk signal data (STM-1) and modulates the signal data in an analog fashion through a baseband processing treatment by means of each radio transmission section 50a. The modulated signal is up-converted to the sixth IF signal by means of the fifth frequency converter. The thus-converted signal is further up-converted to a radio frequency (RF) signal by means of the sixth frequency converter. The radio frequency signal is transmitted. The radio receiving section 50b of the multiplex radio transceiver 71a receives the thus-transmitted signal. The signal is down-converted to the seventh IF signal by means of the seventh frequency converter, and the seventh IF signal is further down-converted to the eighth IF signal by means of the eighth frequency converter. The eighth IF signal is demodulated in an analog fashion and is subjected to a baseband processing treatment. Multiplexed trunk signal data (STM-1) are extracted from the thus-processed signal and are transmitted to another synchronous multiplex repeater or a transmission-end apparatus.

The bidirectional transmission of data mentioned above enables the efficiency of transmission of multiplexed trunk signal data to be significantly improved.

An arbitrary second or third intermediate frequency can be set, and an image frequency does not fall within the group of radio frequency (RF) signals.

Further, so long as the second or third intermediate frequency is set to the value selected in the first embodiment, harmonics of the intermediate frequency F1, i.e., 4·F1, 5·F1, 6·F1, and 7·F1, do not intercept existing sub-bands within C-band.

Further, so long as the second and third intermediate frequencies are set to the value selected in the first embodiment, three bands, i.e., the transmission radio frequency (RF) signal band, the local frequency channel band, and the image frequency band, are separated from one another without overlap.

As a result, the two multiplex radio transceivers which are disposed so as to oppose each other require only one type of transmission band-pass filter having a pass-band for permitting passage of a plurality of radio frequency (RF) signals, thus eliminating a need to filter out a transmission signal for each radio frequency (RF) channel.

Further, a receiving device of the radio transceiver requires only one type of receiving band-pass filter having a pass-band for permitting passage of a plurality of radio frequency (RF) signals, thus eliminating a need to filter out a received signal for each radio frequency (RF) channel.

In short, band-pass filters having different filtering characteristics have been required for individual radio transmission sections disposed within a multiplex radio transmitter, for individual receiving sections disposed within a multiplex radio receiver, and for repeaters. In contrast, according to the modification of the second embodiment, even if a multiplex communications system is allocated several channels, a band-pass filter having common characteristics can be used for the individual radio transmission sections disposed within another multiplex radio transmitter, for individual radio receiving sections disposed within another multiplex radio receiver, or for repeaters, thus promoting common use of members. In this connection, the cost of a multiplex radio transmitter can be reduced.

(C) Others

In the first embodiment, the modification of the first embodiment, the second embodiment, and the modification of the second embodiment, the optimum second intermediate frequency is not limited to a frequency of 844 MHz. It goes without saying that the frequencies defined in (20), (21) can also be used as the optimum second intermediate frequency. Other values which are referred to when the frequency is determined are not limited to the foregoing examples. Further, a band to be used is not limited to C-band.

Needless to say, the present invention is susceptible of various modifications within the scope of the gist of the present invention.

What is claimed is:

1. A multiplex radio transmitter which multiplexes a plurality of channel signals having different frequencies and transmits the multiplexed signal, said multiplex radio transmitter being in a multiple form composed of a plurality of transmission sections provided one for each of a plurality of radio frequency channels, each of said transmission sections comprising:

a modulation section which modulates a data signal and outputs the modulated signal as a first intermediate frequency signal;

a first frequency conversion section which converts the frequency of the first intermediate frequency signal outputted from the modulation section, through use of a first local signal to thus output a second intermediate frequency signal which is higher in frequency than the first intermediate frequency signal by only the frequency of the first local signal;

a first filter which eliminates a frequency component of the first local signal from the second intermediate frequency signal outputted from the first frequency conversion section;

a second frequency conversion section which has an oscillator operable to output a plurality of second local signals, for converting the frequency of a signal outputted from the first filter, through use of a second local signal to thus output a radio frequency signal as an upper side signal higher in frequency than the second intermediate frequency signal by only the frequency of the second local signal, an image frequency signal as a lower side signal obtained by addition of both a first harmonic signal, which is expressed by an integral multiple of the second intermediate frequency signal outputted from said first frequency conversion section, and a second harmonic signal, which is expressed by an integral multiple of the second local signal, the lower end of a radio frequency signal band being higher than the upper end of a second local signal band, the upper end of an image frequency signal band being smaller than the lower end of said second local signal band, said radio frequency signal band, said second local signal band and said image frequency signal band being separated without overlapping one another; and a second filter having at least a band-pass characteristic such as to pass radio frequency signals of a plurality of channels to be used, said second filter being operable to filter out the radio frequency signal as the upper side signal outputted from the second frequency conversion section and to eliminate a frequency component of the second local signal as the lower side signal.

2. The multiplex radio transmitter as defined in claim 1, wherein the modulation section is configured so as to output the first intermediate frequency signal by digitally modulating a digital data signal and converting the digital data signal into an analog data signal.

3. The multiplex radio transmitter as defined in claim 1, wherein the modulation section is configured so as to output the first intermediate frequency signal by converting a digital data signal into an analog data signal and modulating the analog data signal in an analog fashion.

4. The multiplex radio transmitter as defined in claim 1, wherein the second intermediate frequency signal is formed so as to have a frequency whose harmonic component is not superimposed on the radio frequency signal.

5. The multiplex radio transmitter as defined in claim 4, wherein the second intermediate frequency signal is formed so as to have at least a frequency whose harmonic component of sixth order or lower is not superimposed on the radio frequency signal.

6. The multiplex radio transmitter as defined in claim 1, wherein the second frequency conversion section is configured so as to output the radio frequency signal, by converting the frequency of the signal outputted from the first filter through use of the second local signal having any of a plurality of frequencies corresponding to a plurality of channels.

7. A multiplex radio transmitter which multiplexes a plurality of channel signals having different frequencies and transmits the multiplexed signal, said multiplex radio transmitter being in a multiple form composed of a plurality of transmission sections provided one for each of a plurality of radio frequency channels, each of said transmission section comprising:

a digital modulation section which digitally modulates a digital data signal and converts the digital data signal into an analog data signal, to thus output a first intermediate frequency signal;

a first frequency conversion section which converts the frequency of the first intermediate frequency signal outputted from the digital modulation section, through use of a first local signal, thus outputting a second intermediate frequency signal which is higher in frequency than the first intermediate frequency signal by only the frequency of the first local signal, wherein the second intermediate frequency signal has at least a frequency whose harmonic component of sixth order or lower is not superimposed on a radio frequency signal of at least 4 GHZ band or higher to be used as a transmission signal;

a first filter which eliminates a frequency component of the first local signal from the second intermediate frequency signal outputted from the first frequency conversion section;

a second frequency conversion section which has an oscillator operable to output a plurality of second local signals, for converting the frequency of a signal outputted from the first filter, through use of a second local signal having any of a plurality of the frequencies corresponding to a plurality of channels, thus outputting the radio frequency signal as an upper side signal higher in frequency than the second intermediate frequency signal by only the frequency of the second local signal, an image frequency signal as a lower side signal obtained by addition of both a first harmonic signal, which is express by an integral multiple of the second intermediate frequency signal outputted from said first frequency conversion section, and a second harmonic signal, which is expressed by an integral multiple of the second local signal, the lower end of a radio frequency signal band being higher than the upper end of a second local signal band, the upper end of an image frequency signal band being smaller than the lower end of said second local signal band, said radio frequency signal band, said second local signal band and said image frequency signal band being separated without overlapping one another; and a second filter having at least a band-pass characteristic such as to pass radio frequency signal of a plurality of channels to be used and is similar to that of receiving filters of a plurality of receiving sections included in a multiplex radio receiver for receiving the radio frequency disposed so as to oppose said multiplex radio transmitter, said second filter being operable to filter out the radio frequency signal as the upper side signal outputted from the second frequency conversion section and to eliminate a frequency component of the second local signal as the lower side signal.

8. The multiplex radio transmitter as defined in claim 7, wherein the frequency of the second intermediate frequency signal is set to a required frequency between 842.00 MHz and 845.02 MHz.

9. The multiplex radio transmitter as defined in claim 8, wherein the frequency of the second intermediate frequency signal is set to a frequency of 844 MHz.

10. The multiplex radio transmitter as defined in claim 7, wherein the frequency of the second intermediate frequency signal is set to a frequency of 967.1 MHz.

11. A multiplex radio transmission method for use with a multiplex radio transmitter which multiplexes a plurality of channel signals having different frequencies into a signal and transmits the thus multiplexed signal, comprising the steps of:
at each of a plurality of transmission sections provided so as to correspond to channels
(a) producing a first intermediate frequency signal by modulating a data signal;
(b) converting the intermediate frequency signal into a second intermediate frequency signal having an intermediate frequency between the frequency of the intermediate frequency signal and that of the radio frequency signal and converting the second intermediate frequency signal into the radio frequency signal as an upper side signal;
(c) outputting the radio frequency signal and an image frequency signal as a lower side signal obtained by addition of both a first harmonic signal, which is expressed by an integral multiple of the second intermediate frequency signal outputted from said first frequency conversion section, and a second harmonic signal, which is expressed by an integral multiple of the second local signal, the lower end of a radio frequency signal band being higher than the upper end of a second local signal band, the upper end of an image frequency signal band being smaller than the lower end of said second local signal band, said radio frequency signal band, said second local signal band and said image frequency signal band being separated without overlapping one another; and
(d) filtering out the radio frequency signal so that a radio frequency signal band, a local signal band, and an image frequency band, whose image frequency signal is obtained by multiplication of the second intermediate frequency signal by the second local signal are separated without overlapping one another.

12. A multiplex radio receiver including a plurality of receiving sections provided one for each of a plurality of radio frequency channels for the purpose of receiving, by way of a radio propagation path, radio frequency signals transmitted from a multiplex radio transmitter disposed so as to oppose said multiplex radio receiver, wherein said multiplex radio transmitter has a plurality of transmission sections, which are included in said multiplex radio transmitter for transmitting the radio frequency and are provided so as to correspond to a plurality of channel signals having different frequencies, for converting a first intermediate frequency signal resulting from modulation of a data signal into a second intermediate frequency signal having an intermediate frequency between the frequency of the first intermediate frequency signal and that of a radio frequency and converting the second intermediate frequency into an image frequency signal as a lower side signal obtained by addition of both a first harmonic signal, which is expressed by an integral multiple of the second intermediate frequency signal outputted from said first frequency conversion section, and a second harmonic signal, which is expressed by an integral multiple of the second local signal and the radio frequency signal, the lower end of a radio frequency signal band being higher than the upper end of a second local signal band, the upper end of an image frequency signal band being smaller than the lower end of said second local signal band, said radio frequency signal band, said second local signal band and said image frequency signal band being separated without overlapping one another;
a third filter having at last a band-pass characteristic such as to pass radio frequencies of a plurality of channels to be used and is similar to that of transmission filters of the plurality of transmission sections, said third filter being operable to filter out the received radio frequency signal and to eliminate a frequency component of an image signal of the radio frequency signal;
a third frequency conversion section which converts the frequency of a signal outputted from the third filter through use of a third local signal to thus output a third intermediate frequency signal which is lower in frequency than the radio frequency signal by only the frequency of the third local signal;
a fourth frequency conversion section which converts the frequency of a signal outputted from the third frequency conversion section through use of a fourth local signal to thus output a fourth intermediate frequency signal which is lower in frequency than the third intermediate frequency signal by only the frequency of the fourth local signal; and
a demodulation section which demodulates the data signal by demodulation of an output from the fourth frequency conversion section.

13. The multiplex radio receiver as defined in claim 12, wherein the transmission section of the multiplex radio transmitter is configured so as to produce the first intermediate frequency signal by digitally modulating a digital data signal and converting the digital data signal into an analog data signal; and
the demodulation section is configured so as to demodulate the data signal by analog-to-digital converting an outputted from the fourth frequency conversion section and demodulating the digital data signal.

14. The multiplex radio receiver as defined in claim 12, wherein the transmission section of the multiplex radio transmitter is configured so as to produce the first intermediate frequency signal by converting a digital data signal into an analog data signal and modulating the analog data signal in an analog fashion; and
the demodulation section is configured so as to obtain the digital data signal by demodulating an analog outputted from the fourth frequency conversion section in an analog fashion and analog-to-digital converting the demodulated analog output.

15. The multiplex radio receiver as defined in claim 12, wherein the transmission section of the multiplex radio transmitter is configured so as to output the radio frequency signal, by converting the frequency of the signal outputted from the first filter through use of the second local signal having any of a plurality of frequencies corresponding to a plurality of channels; and the third frequency conversion section is configured so as to output the third intermediate frequency signal, by converting the frequency of the signal outputted from the third filter through use of the third local signal having any of a plurality of frequencies corresponding to a plurality of channels.

16. A multiplex radio receiving method, comprising the steps of:
at a plurality of transmission sections of said multiplex radio transmitter,
(a) converting a first intermediate frequency signal resulted from modulation of a data signal into a second intermediate frequency signal having an intermediate frequency between the frequency of the first intermediate frequency signal and that of a radio frequency signal and converting the second intermediate frequency into an image frequency signal as a lower side signal obtained by addition of both a first harmonic signal which is expressed by an integral multiple of said second intermediate frequency signal and the second harmonic signal, which is expressed by an integral multiple of said second local signal and the radio frequency signal, the lower end of a radio frequency signal band being higher than the upper end of a second local signal band, the upper end of an image frequency signal band being smaller than the lower end of said second local signal band, said radio frequency signal band, said second local signal band and said image frequency signal band being separated without overlapping one another and which are provided so as to correspond to a plurality of channel signals having different frequencies;
at a plurality of receiving sections provided so as to correspond to the respective channels,
(b) receiving radio frequency signals transmitted over a radio propagation path from said multiplex radio transmitter;
at filters being included in a plurality of receiving sections and having characteristics similar to those of transmission filters of a plurality of transmission sections, for transmitting the radio frequency;
(c) filtering out the received radio frequency signal;
(d) converting the radio frequency signal to a third intermediate frequency signal, which is lower in frequency than the radio frequency signal, through frequency conversion;
(e) converting the third intermediate frequency signal to a fourth intermediate frequency signal, which is lower in frequency than the third intermediate frequency signal, through frequency conversion; and
(f) obtaining the data signal by demodulation of the fourth intermediate frequency signal.

17. A multiplex radio transceiver comprising:
a multiplex radio transmitter which includes a plurality of transmission sections provided one for each of a plurality of radio frequency channels for the purpose of multiplexing a plurality of channel signals having different frequencies and for the purpose of transmitting the multiplexed signal each transmission section comprising:
a modulation section which modulates a data signal and outputs the modulated data signal as a first intermediate frequency signal;
a first frequency conversion section which converts the frequency of a signal outputted from the modulation section through use of a first local signal, thus outputting a second intermediate frequency signal which is higher in frequency than the first intermediate frequency signal by only the frequency of the first local signal;
a first filter which eliminates a frequency component of the first local signal from the second intermediate frequency signal outputted from the first frequency conversion section;
a second frequency conversion section which has an oscillator operable to output a plurality of second local signals, for converting the frequency of a signal outputted from the first filter through use of the second local signal, thus outputting a radio frequency signal as an upper side signal higher in frequency than the second intermediate frequency signal by only the frequency of the second local signal, an image frequency signal as a lower side signal obtained by addition of both a first harmonic signal, which is expressed by an integral multiple of the second intermediate frequency signal outputted from said first frequency conversion section, and a second harmonic signal, which is expressed by an integral multiple of the second local signal, the lower end of a radio frequency signal band being higher than the upper end of a second local signal band, the upper end of an image frequency signal band being smaller than the lower end of said second local signal band, said radio frequency signal band, said second local signal band and said image frequency signal band being separated without overlapping one another;
a second filter having at least a band-pass characteristic such as to pass radio frequency signals of a plurality of channels to be used, said second filter being operable to filter out the radio frequency signal as the upper side signal outputted from the second frequency conversion section and to eliminate a frequency component of the second local signal as the lower side signal so that a radio frequency signal band, a local signal band, and an image frequency band, whose image frequency signal is obtained by multiplication of the second intermediate frequency signal by the second local signal, are separated without overlapping one another, and
a multiplex radio receiver including a plurality of receiving sections which are provided one for each of a plurality of radio frequency channels to be used by the opposing multiplex radio transmitter for the purpose of receiving by way of a radio propagation path radio frequency signals transmitted from the opposing multiplex radio transmitter disposed so as to oppose said multiplex radio receiver, for converting a first intermediate frequency signal resulting from modulation of a data signal into a second intermediate frequency signal having an intermediate frequency signal and that of the opposing radio frequency signal transmitted from said opposing multiplex radio transmitter, and converting the second intermediate frequency into an image frequency signal as the lower side signal obtained by addition of both a first harmonic signal, which is expressed by an integral multiple of said second intermediate frequency signal, and the second harmonic signal, which is expressed by an integral multiple of said second local signal and the opposing radio frequency signal, said lower end of the opposing radio frequency signal band being higher than the upper end of the second local signal band, and said upper end of said image frequency signal band being smaller than the lower end of said second local signal band, said radio frequency signal band, said second local signal band and said image frequency signal band being separated without overlapping one another; each receiving section comprising:
- a fourth filter having at least a band-pass characteristic such as to pass the opposing radio frequencies of a plurality of channels to be used by the opposing multiplex radio transmitter and is similar to that of transmission filters of the transmission section, said fourth filter being operable to filter out the opposing received radio frequency signal and to eliminate a frequency component of an image signal of the opposite radio frequency signal;
- a fifth frequency conversion section which converts the frequency of a signal outputted from the fourth filter through use of a fifth local signal to thus output a fifth intermediate frequency signal which is lower in frequency than the opposing radio frequency signal by only the frequency of the fifth local signal;
- a sixth frequency conversion section which converts the frequency of a signal outputted from the fifth frequency conversion section through use of a sixth local signal to thus output a sixth intermediate frequency signal which is lower in frequency than the fifth intermediate frequency signal by only the frequency of the sixth local signal; and a demodulation section which demodulates the data signal by demodulation of an output from the sixth frequency conversion section.

18. A multiplex radio transmission and receiving system comprising:
- a multiplex radio transmitter which includes a plurality of transmission sections provided one for each of a plurality of radio frequency channels for the purpose of multiplexing a plurality of channel signals having different frequencies and for the purpose of transmitting the multiplexed signal, each transmission section comprising:
  - a modulation section which modulates a data signal and outputs the modulated data signal as a first intermediate frequency signal;
  - a first frequency conversion section which converts the frequency of a signal outputted from the modulation section through use of a first local signal, thus outputting a second intermediate frequency signal which is higher in frequency than the first intermediate frequency signal by only the frequency signal outputted from the first frequency conversion section;
  - a first filter which eliminates a frequency component of the first local signal from the second intermediate frequency signal outputted from the first frequency conversion section;
  - a second frequency conversion section which has an oscillator operable to output a plurality of second local signals corresponding to the plurality of channels, for converting the frequency of a signal outputted from the first filter through use of a second local signal, signal, to output a radio frequency signal as an upper side signal higher in frequency than the second intermediate frequency signal by only the frequency of the second local signal, an image frequency signal as the lower side signal obtained by addition of both a first harmonic signal, which is expressed by an integral multiple of the second intermediate frequency signal outputted from said first frequency conversion section, and a second harmonic signal, which is expressed by an integral multiple of the second local signal, said lower end of said radio frequency signal band being higher than the upper end of said second local signal band, and said upper end of said image frequency signal band being smaller than the lower end of said second local signal band, said radio frequency signal band, said second local signal band and said image frequency signal band being separated without overlapping one another;
  - a second filter having at least a band-pass characteristic such as to pass radio frequency signals of a plurality of channels to be used, said second filter being operable to filter out the radio frequency signal outputted from the second frequency conversion section and to eliminate a frequency component of the second local signal as the lower side signal so that a radio frequency signal band, a local signal band, and an image frequency band, whose image frequency signal is obtained by multiplication of the second intermediate frequency signal by the second local signal, are separated without overlapping one another; and
- a multiplex radio receiver which includes a plurality of receiving sections provided one for each of a plurality of radio frequency channels for the purpose of receiving by way of a radio propagation path radio frequency signals transmitted from the plurality of transmission sections of said multiplex radio transmitter, each receiving section comprising:
  - a third filter having at least a band-pass characteristic such as to pass radio frequencies of a plurality of channels to be used and is similar to that of transmission filters of the transmission section, said third filter being operable to filter out the received radio frequency signal and to eliminate a frequency component of an image signal of the radio frequency signal;
  - a third frequency conversion section which converts the frequency of a signal outputted from the third filter through use of a third local signal to thus output a third intermediate frequency signal which is lower in frequency that the radio frequency signal by only the frequency of the third local signal;
  - a fourth frequency conversions section which converts the frequency of a signal outputted from the third frequency conversions section through use of a fourth local signal to thus output a fourth intermediate frequency signal which is lower in frequency than the third intermediate frequency signal by only the frequency of the fourth local signal; and
  - a demodulation section which demodulates the data signal by demodulation of an output from the fourth frequency conversion section.

* * * * *